United States Patent
Hakuta et al.

(10) Patent No.: US 10,923,095 B2
(45) Date of Patent: Feb. 16, 2021

(54) SOUNDPROOF STRUCTURE

(71) Applicant: FUJIFILM Corporation, Tokyo (JP)

(72) Inventors: Shinya Hakuta, Ashigara-kami-gun (JP); Shogo Yamazoe, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 541 days.

(21) Appl. No.: 15/848,520

(22) Filed: Dec. 20, 2017

(65) Prior Publication Data

US 2018/0114516 A1 Apr. 26, 2018

Related U.S. Application Data

(63) Continuation of application No. PCT/JP2016/073940, filed on Aug. 16, 2016.

(30) Foreign Application Priority Data

Aug. 21, 2015 (JP) .............................. JP2015-164233
Apr. 28, 2016 (JP) .............................. JP2016-090719

(51) Int. Cl.
*G10K 11/168* (2006.01)
*G10K 11/172* (2006.01)
(Continued)

(52) U.S. Cl.
CPC .............. *G10K 11/168* (2013.01); *B32B 3/12* (2013.01); *B32B 3/266* (2013.01); *B32B 27/08* (2013.01);
(Continued)

(58) Field of Classification Search
CPC ...... G10K 11/172; G10K 11/168; B32B 3/12; B32B 3/266; B32B 27/08; B32B 27/308;
(Continued)

(56) References Cited

U.S. PATENT DOCUMENTS

| 4,265,955 A * | 5/1981 | Harp ..................... B29D 24/005 428/116 |
| 7,395,898 B2 * | 7/2008 | Yang ..................... G10K 11/172 181/286 |

(Continued)

FOREIGN PATENT DOCUMENTS

| JP | 10-326097 A | 12/1998 |
| JP | 2005-250474 A | 9/2005 |

(Continued)

OTHER PUBLICATIONS

International Preliminary Report on Patentability and Written Opinion of the International Searching Authority (forms PCT/IB/373, PCT/ISA/237 and PCT/IB/326), dated Mar. 8, 2018, for corresponding International Application No. PCT/JP2016/073940, with an English translation of the Written Opinion.

(Continued)

*Primary Examiner* — Forrest M Phillips
(74) *Attorney, Agent, or Firm* — Birch, Stewart, Kolasch & Birch, LLP

(57) ABSTRACT

There is provided a laminated soundproof structure formed by laminating a single layer soundproof structure having one or more soundproof cells which are arranged in a two-dimensional plane and each of which includes a frame, a film, and an opening portion including a hole. The single layer soundproof structure has a shielding peak frequency, which is determined by the opening portion of each of the soundproof cells and at which a transmission loss is maximized, on a lower frequency side than a first natural vibration frequency of the film of each of the soundproof cells. The soundproof cells of the single layer soundproof structures are laminated with a distance therebetween, and at least some of the laminated soundproof cells have the same conditions of the frame, the film, and the opening portion.

19 Claims, 24 Drawing Sheets

(51) Int. Cl.
 *E04B 1/84*     (2006.01)
 *E04B 1/86*     (2006.01)
 *B32B 3/12*     (2006.01)
 *B32B 3/26*     (2006.01)
 *B32B 27/08*     (2006.01)
 *B32B 27/30*     (2006.01)
 *B32B 27/36*     (2006.01)
 *E01F 8/00*     (2006.01)

(52) U.S. Cl.
 CPC ............ *B32B 27/308* (2013.01); *B32B 27/36* (2013.01); *E04B 1/84* (2013.01); *E04B 1/86* (2013.01); *G10K 11/172* (2013.01); *B32B 2307/102* (2013.01); *E01F 8/0005* (2013.01); *E04B 2001/8433* (2013.01); *E04B 2001/8485* (2013.01)

(58) Field of Classification Search
 CPC ....... B32B 2307/102; E04B 1/86; E04B 1/84; E04B 2001/8433; E04B 2001/8485; E01F 8/0005
 USPC .......................................................... 181/286
 See application file for complete search history.

(56) References Cited

U.S. PATENT DOCUMENTS

| | | | |
|---|---|---|---|
| 8,869,933 B1* | 10/2014 | McKnight | G10K 11/172 181/207 |
| 9,270,253 B2* | 2/2016 | Chang | H03H 9/25 |
| 10,099,317 B2* | 10/2018 | Hakuta | B23K 26/382 |
| 10,676,919 B2* | 6/2020 | Yamazoe | G10K 11/16 |
| 2006/0289229 A1* | 12/2006 | Yamaguchi | G10K 11/172 181/290 |
| 2010/0175949 A1* | 7/2010 | Yamaguchi | G10K 11/172 181/286 |
| 2011/0240402 A1* | 10/2011 | Chou | F16F 15/04 181/207 |
| 2013/0087407 A1* | 4/2013 | McKnight | G10K 11/172 181/287 |
| 2020/0143784 A1* | 5/2020 | Huang | E04F 13/075 |

FOREIGN PATENT DOCUMENTS

| | | |
|---|---|---|
| JP | 2008-207763 A | 9/2008 |
| JP | 2009-139556 A | 6/2009 |
| JP | 2011-39356 A | 2/2011 |
| JP | 4832245 B2 | 12/2011 |

OTHER PUBLICATIONS

International Search Report (form PCT/ISA/210), dated Nov. 8, 2016, for corresponding International Application No. PCT/JP2016/073940, with an English translation.

* cited by examiner

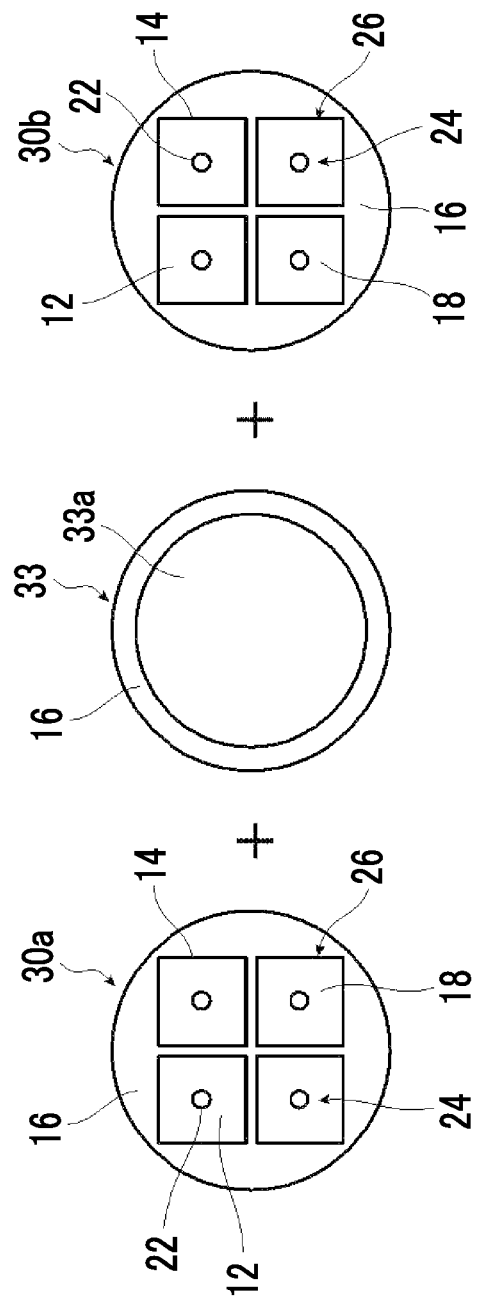

SOUNDPROOF STRUCTURE

CROSS-REFERENCE TO RELATED APPLICATIONS

This application is a Continuation of PCT International Application No. PCT/JP2016/073940 filed on Aug. 16, 2016, which claims priority under 35 U.S.C. § 119(a) to Japanese Patent Application No. 2015-164233 filed on Aug. 21, 2015, and Japanese Patent Application No. 2016-090719 filed on Apr. 28, 2016. Each of the above applications is hereby expressly incorporated by reference, in its entirety, into the present application.

BACKGROUND OF THE INVENTION

1. Field of the Invention

The present invention relates to a soundproof structure, and more particularly to a soundproof structure that is a multilayered laminated soundproof structure in which a single layer soundproof structure, which is formed by arranging one soundproof cell including a frame, a film fixed to the frame, and an opening portion including one or more holes drilled in the film or formed by arranging a plurality of soundproof cells in a two-dimensional manner, is laminated and that is for strongly shielding the sound of a target frequency selectively.

2. Description of the Related Art

In the case of a general sound insulation material, as the mass increases, the sound is more effectively shielded. Accordingly, in order to obtain a good sound insulation effect, the sound insulation material itself becomes large and heavy. On the other hand, in particular, it is difficult to shield the sound of low frequency components. In general, this region is called a mass law, and it is known that the shielding increases by 6 dB in a case where the frequency doubles.

Thus, most of the conventional soundproof structures are disadvantageous in that the soundproof structures are large and heavy due to sound insulation by the mass of the structures and that it is difficult to shield low frequencies.

For this reason, as a sound insulation material corresponding to various situations, such as equipment, automobiles, and general households, a light and thin sound insulation structure has been demanded. In recent years, therefore, a sound insulation structure for controlling the vibration of a film by attaching a frame to a thin and light film structure has been drawing attention (refer to JP4832245B, U.S. Pat. No. 7,395,898B (corresponding Japanese Patent Application Publication: JP2005-250474A), and JP2009-139556A).

In the case of these structures, the principle of sound insulation is a stiffness law different from the mass law described above. Accordingly, low frequency components can be further shielded even with a thin structure. This region is called a stiffness law, and the behavior is the same as in a case where a film has a finite size matching a frame opening portion since the film vibration is fixed at the frame portion.

JP4832245B discloses a sound absorber that has a frame body, which has a through-hole formed therein, and a sound absorbing material, which covers one opening of the through-hole and whose first storage modulus E1 is $9.7 \times 10^6$ or more and second storage modulus E2 is 346 or less (refer to abstract, claim 1, paragraphs [0005] to [0007] and [0034], and the like). The storage modulus of the sound absorbing material means a component, which is internally stored, of the energy generated in the sound absorbing material by sound absorption.

In JP4832245B, in the embodiment, by using a sound absorbing material containing a resin or a mixture of a resin and a filler as a mixing material, it is possible to obtain the peak value of the sound absorption rate in the range of 0.5 to 1.0 and the peak frequency in the range of 290 to 500 Hz and to achieve a high sound absorption effect in a low frequency region of 500 Hz or less without causing an increase in the size of the sound absorber.

In addition, U.S. Pat. No. 7,395,898B (corresponding Japanese Patent Application Publication: JP2005-250474A) discloses a sound attenuation panel including an acoustically transparent two-dimensional rigid frame divided into a plurality of individual cells, a sheet of flexible material fixed to the rigid frame, and a plurality of weights, and a sound attenuation structure (refer to claims 1, 12, and 15, FIG. 4, page 4, and the like). In the sound attenuation panel, the plurality of individual cells are approximately two-dimensional cells, each weight is fixed to the sheet of flexible material so that the weight is provided in each cell, and the resonance frequency of the sound attenuation panel is defined by the two-dimensional shape of each cell, the flexibility of the flexible material, and each weight thereon.

U.S. Pat. No. 7,395,898B (corresponding Japanese Patent Application Publication: JP2005-250474A) discloses that the sound attenuation panel has the following advantages compared with the related art. That is, (1) the acoustic panel can be made very thin. (2) The acoustic panel can be made very light (with a low density). (3) The panel can be laminated together to form wide-frequency locally resonant sonic materials (LRSM) since the panel does not follow the mass law over a wide frequency range, and in particular, this can deviate from the mass law at frequencies lower than 500 Hz. (4) The panel can be easily and inexpensively manufactured (refer to page 5, line 65 to page 6, line 5).

JP2009-139556A discloses a sound absorber which is partitioned by a partition wall serving as a frame and is closed by a rear wall (rigid wall) of a plate-shaped member and in which a film material (film-shaped sound absorbing material) covering an opening portion of the cavity whose front portion is the opening portion is covered, a pressing plate is placed thereon, and a resonance hole for Helmholtz resonance is formed in a region (corner portion) in the range of 20% of the size of the surface of the film-shaped sound absorbing material from the fixed end of the peripheral portion of the opening portion that is a region where the displacement of the film material due to sound waves is the least likely to occur. In the sound absorber, the cavity is blocked except for the resonance hole. The sound absorber performs both a sound absorbing action by film vibration and a sound absorbing action by Helmholtz resonance.

SUMMARY OF THE INVENTION

Incidentally, most of the conventional soundproof structures have problems that the soundproof structures are large and heavy due to sound insulation by the mass of the structures and that it is difficult to shield low frequencies. A sponge structure having voids thereinside, such as urethane or synthrate, which is often used as a soundproof material has poor heat conductivity and heat dissipation so that the sponge structure can be used as a heat insulation material. For this reason, measures against heat are essential for use in automobiles and the like. In particular, there has been a problem it is extremely difficult to use the sponge structure immediately in the vicinity of an engine or the like serving as a heat source.

In addition, since the sound absorber disclosed in JP4832245B is light and the peak value of the sound absorption rate is as high as 0.5 or more, it is possible to achieve a high sound absorption effect in a low frequency region where the peak frequency is 500 Hz or less. However, there has been a problem that the range of selection of a sound absorbing material is narrow and accordingly it is difficult to achieve the high sound absorption effect in a low frequency region.

Since the sound absorbing material of such a sound absorber completely blocks the through-hole of the frame body, the sound absorbing material does not allow wind or heat to pass therethrough and accordingly heat tends to accumulate on the inside. For this reason, there is a problem that this is not suitable for the sound insulation of equipment and automobiles, which is disclosed in JP4832245B in particular.

In addition, the sound insulation performance of the sound absorber disclosed in JP4832245B changes smoothly according to the usual stiffness law or mass law. For this reason, it has been difficult to effectively use the sound absorber in general equipment and automobiles in which specific frequency components, such as motor sounds, are often strongly generated in a pulsed manner.

The sound attenuation panel disclosed in U.S. Pat. No. 7,395,898B (corresponding Japanese Patent Application Publication: JP2005-250474A) has the following problems even though large shielding can be obtained on the low frequency side due to the combination structure of the frame, the film, and the weight.

In the sound attenuation panel disclosed in U.S. Pat. No. 7,395,898B (corresponding Japanese Patent Application Publication: JP2005-250474A), a weight is essential for the film. Accordingly, since the structure becomes heavy, it is difficult to use the sound attenuation panel in equipment, automobiles, general households, and the like.

There is no easy means for placing the weight in each cell structure. Accordingly, there is no manufacturing suitability. In addition, since adhesion to the weight and the film is needed, the cost is correspondingly increased.

Since the frequency and size of shielding strongly depend on the weight of the weight and the position of the weight on the film, robustness as a sound insulation material is low. Accordingly, there is no stability.

Since the film is specified as an impermeable film, the film does not allow wind or heat to pass therethrough and accordingly heat tends to accumulate on the inside. For this reason, this is not suitable for the sound insulation of equipment and automobiles in particular.

In JP2009-139556A, since it is necessary to use both the sound absorbing action by film vibration and the sound absorbing action by Hertzholm resonance, the rear wall of the partition wall serving as a frame is blocked by the plate-shaped member. Therefore, similarly to JP4832245B, since it is not possible to pass the wind and heat, heat tends to accumulate on the inside. For this reason, there is a problem that the sound absorber is not suitable for sound insulation of equipment, automobiles, and the like.

An object of the present invention is to solve the aforementioned problems of the conventional techniques and provide a soundproof structure which is light and thin, in which sound insulation characteristics such as a shielding frequency and a shielding size do not depend on the position and shape of a through-hole, which has high robustness as a sound insulation material and is stable, which has air permeability so that wind and heat can pass therethrough and accordingly has no heat thereinside, which can realize extremely strong soundproofing performance or widen the range of sound insulation according to the distance of a two-layer structure, which can adjust the shielding frequency, which is suitable for equipment, automobiles, and household applications, and which is excellent in manufacturability, by forming the two-layer structure by laminating single layer soundproof structures configured to include a frame, a film, and one or more holes of an opening portion of the same conditions.

In the present invention, "soundproof" includes the meaning of both "sound insulation" and "sound absorption" as acoustic characteristics, but in particular, refers to "sound insulation". "Sound insulation" refers to "shielding sound", that is, "not transmitting sound", and accordingly, includes "reflecting" sound (reflection of sound) and "absorbing" sound (absorption of sound) (refer to Sanseido Daijibin (Third Edition) and http://www.onzai.or.jp/question/sound-proof.html and http://www.onzai.or.jp/pdf/new/gijutsu201312_3.pdf on the web page of the Japan Acoustological Materials Society).

Hereinafter, basically, "sound insulation" and "shielding" are referred to in a case where "reflection" and "absorption" are not distinguished from each other, and "reflection" and "absorption" are referred to in a case where "reflection" and "absorption" are distinguished from each other.

In the present invention, the distance of the two-layer structure refers to the average distance in the lamination direction between the film surfaces facing each other in a case where two layers are laminated, and is defined as an "inter-film distance".

Even in a case where two layers are slightly obliquely disposed, the average distance of the distance between the film surfaces facing each other can be defined as the "inter-film distance".

In order to achieve the aforementioned object, a soundproof structure of the present invention is a laminated soundproof structure formed by laminating a single layer soundproof structure having one or more soundproof cells arranged in a two-dimensional plane. Each of the one or more soundproof cells of the single layer soundproof structure comprises a frame having a through-hole, a film fixed to the frame, and an opening portion configured to include one or more holes drilled in the film. The single layer soundproof structure has a basic shielding peak frequency, which is determined by the opening portion of each of the one or more soundproof cells and at which a transmission loss is maximized, on a lower frequency side than a first natural vibration frequency of the film of each of the one or more soundproof cells. One soundproof cell of one of the laminated single layer soundproof structures and one soundproof cell of the other laminated single layer soundproof structure are laminated with a distance therebetween. At least some of the soundproof cells laminated with the distance therebetween have the same conditions of the frame, the film, and the opening portion.

Here, it is preferable that the one or more soundproof cells are a plurality of soundproof cells arranged in a two-dimensional manner.

It is preferable that the laminated soundproof structure has one or more minimum values at which a transmission loss due to natural vibration of the laminated soundproof cells is minimized, has one or more maximum values, which are determined by the opening portions of the laminated soundproof cells and at which a transmission loss is maximized, on a lower frequency side than one or more minimum frequencies corresponding to the one or more minimum values, and has one or more lamination shielding peak frequencies corresponding to the one or more maximum values and that sound in a predetermined frequency band centered on each of the one or more lamination shielding peak frequencies is selectively insulated.

It is preferable that the laminated soundproof structure has, as the one or more minimum frequencies, two or more maximum values at which a sound absorbance is maximized by interaction of the first natural vibration frequencies of the two laminated single layer soundproof structures, natural vibrations thereof, and a gas layer between two layers, and has two or more maximum frequencies relevant to absorption corresponding to the two or more maximum values. This is because there are two or more minimum values, at which the transmission loss due to natural vibration is minimized, due to interaction between the first natural vibration frequencies of the two laminated single layer soundproof structures and natural vibrations thereof and the two or more minimum values correspond to two or more minimum frequencies corresponding to the two or more minimum values of the transmission loss.

It is preferable that, in the laminated soundproof structure, as the distance between the two laminated single layer soundproof structures becomes larger, the two or more maximum frequencies corresponding to the two or more maximum values become closer to each other. This is because the two or more minimum frequencies corresponding to the two or more minimum values become closer to each other.

It is preferable that the laminated soundproof structure has two or more maximum values which are determined on a lower frequency side than the first natural vibration frequency of each of the two laminated single layer soundproof structures due to the opening portion of each of the laminated soundproof cells and at which the transmission loss is maximized, as the one or more lamination shielding peak frequencies, due to interaction between the natural vibrations of the soundproof cells laminated in two layers, and has two or more lamination shielding peak frequencies corresponding to the two or more maximum values.

It is preferable that, in the laminated soundproof structure, as the distance between the two laminated single layer soundproof structures becomes larger, the two or more lamination shielding peak frequencies corresponding to the two or more maximum values become closer to each other.

Assuming that the distance is a, it is preferable that a difference between the two or more lamination shielding peak frequencies is expressed by following Equation (1).

$$Df = C \times \exp(-b \times a) \quad (1)$$

Here, a unit of the distance a is mm, and b and c are constants.

It is preferable that the constant b is a value within a range of 0.1 to 0.2.

It is preferable that the distance between the two laminated single layer soundproof structures of the laminated soundproof structure is less than a wavelength (wavelength size corresponding to the lamination shielding peak frequency) of a shielding peak at which the transmission loss is maximized.

It is preferable that the one or more maximum values of the transmission loss of the laminated soundproof structure are larger values than a maximum value of the transmission loss of the single layer soundproof structure due to the single layer soundproof structure being laminated in two layers.

It is preferable that the laminated soundproof structure has a maximum value of an absorbance on a lower frequency side than a maximum value of the transmission loss on a lower frequency side than the first natural vibration frequency of each of the two laminated single layer soundproof structures, which is determined by the opening portion of each of the laminated soundproof cells, due to the single layer soundproof structure being laminated in two layers.

It is preferable that a frequency on a lower frequency side than a minimum value of the transmission loss corresponding to the first natural vibration frequency of the single layer soundproof structure is included in a range of 10 Hz to 100000 Hz.

Assuming that a circle equivalent radius of the frame is R2 (m), a thickness of the film is t2 (m), a Young's modulus of the film is E2 (Pa), and a density of the film is d (kg/m$^3$), a parameter B expressed by following Equation (2) is preferably 15.47 or more and 235000 or less.

$$B = t2/R2^{2} \ast \sqrt{(E2/d)} \quad (2)$$

In a case where the one or more soundproof cells of the laminated soundproof structure are a plurality of soundproof cells arranged in a two-dimensional manner, it is preferable that 60% or more of the laminated soundproof cells are formed by the frame, the film, and the opening portion of the same size.

It is preferable that the frame of each of the laminated soundproof cells of the laminated soundproof structure has a continuous frame structure and that, in at least some of the laminated soundproof cells, the film is disposed on two or more planes of at least one plane of two surfaces of the frame structure and/or a plane of an intermediate portion between the two surfaces.

It is preferable that, in at least some of the laminated soundproof cells of the laminated soundproof structure, a space between the films of the soundproof cells laminated so as to be adjacent to each other is blocked by the frame.

It is preferable that, in at least some of the laminated soundproof cells of the laminated soundproof structure, the opening portions drilled in the films overlap each other.

It is preferable that "conditions of the frame, the film, and the opening portion of the laminated soundproof cells are the same" means that an average of a shift amount of each of a first natural vibration frequency and a shielding peak frequency of a spectrum of the transmission loss between the soundproof cells of the laminated single layer soundproof structures of the laminated soundproof structure is 10% or less.

According to the present invention, it is possible to provide a soundproof structure which is light and thin, in which sound insulation characteristics such as a shielding frequency and a shielding size do not depend on the position and shape of a through-hole, which has high robustness as a sound insulation material and is stable, which has air permeability so that wind and heat can pass therethrough and accordingly has no heat thereinside, which can realize extremely strong soundproofing performance or widen the range of sound insulation according to the distance of a two-layer structure, which can adjust the shielding frequency, which is suitable for equipment, automobiles, and household applications, and which is excellent in manufacturability, by forming the two-layer structure by laminating single layer soundproof structures configured to include a frame, a film, and an opening portion (one or more holes) of the same conditions.

In particular, according to the present invention, even if the single layer soundproof structures configured to include the frame, the film, and the opening portions (one or more holes) of the same conditions are laminated, the shielding peak can be divided into two by making the distance between the two layers very small. Due to this effect, it is possible to design a broad band even in the lamination under the same conditions. In addition, it is possible to adjust the shielding peak frequency by controlling the distance between the two layers.

According to the present invention, since the soundproof effect is determined by the hardness, density, and thickness among the physical properties of the film and does not depend on the other physical properties, a combination with other various excellent physical properties, such as flame retardancy, high transparency, biocompatibility, and radio wave transparency, is possible.

For example, for the radio wave transparency, the radio wave transparency is secured by a combination of a dielectric film and a frame material having no electrical conductivity, such as acrylic, and on the other hand, radio waves can be shielded by covering the entire surface with a metal film or a frame material having a large electrical conductivity, such as aluminum.

BRIEF DESCRIPTION OF THE DRAWINGS

FIG. 9 is an explanatory view illustrating the configuration of a soundproof structure according to another embodiment of the present invention using plan views of upper and lower single layer soundproof structures.

DESCRIPTION OF THE PREFERRED EMBODIMENTS

Hereinafter, a soundproof structure according to the present invention will be described in detail with reference to preferred embodiments shown in the accompanying diagrams.

Figure 1:
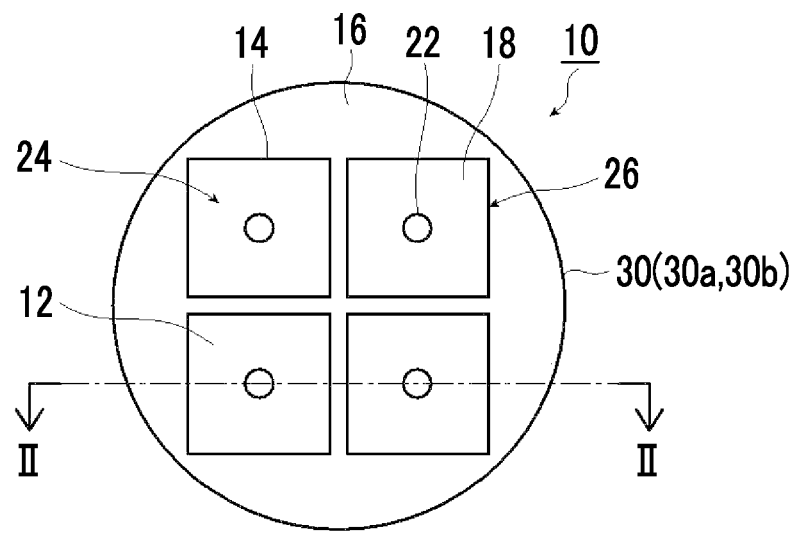
FIG. 1 is a plan view schematically showing an example of a soundproof structure according to an embodiment of the present invention.
Figure 2:
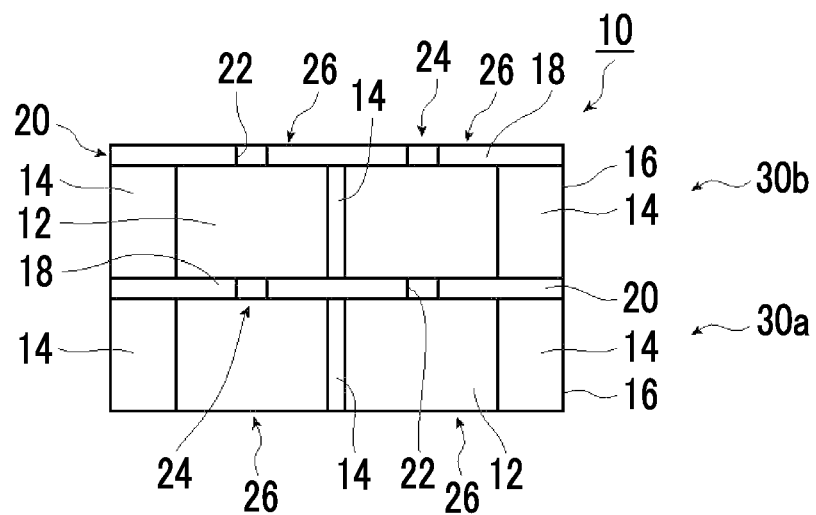
FIG. 2 is a schematic cross-sectional view of the soundproof structure shown in FIG. 1 taken along the line II-II.
Figure 3:
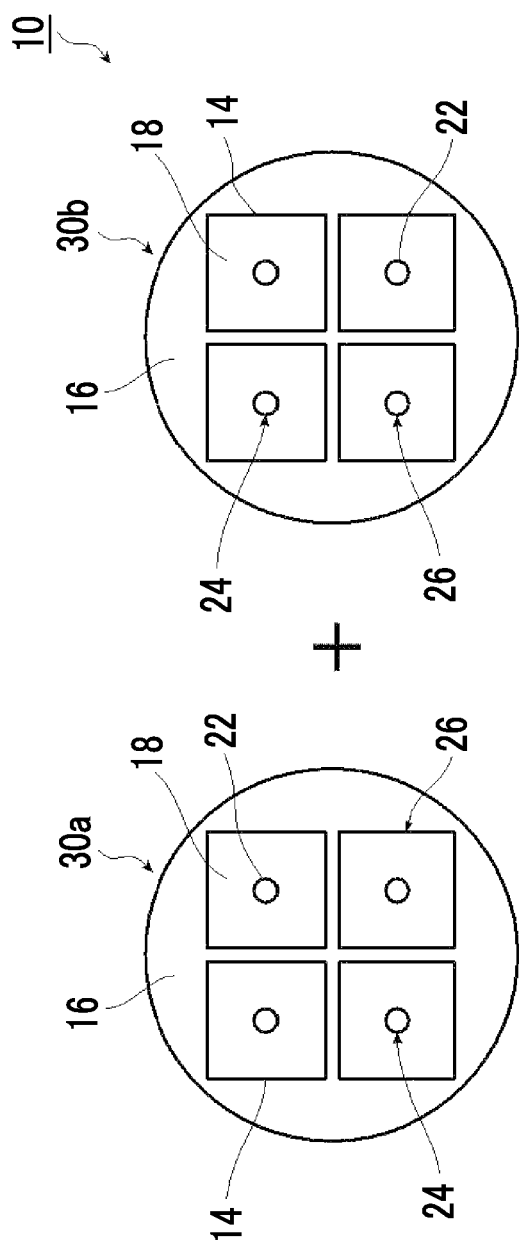
FIG. 3 is an explanatory view illustrating the configuration of the soundproof structure according to the present invention using plan views of upper and lower single layer soundproof structures.
Figure 4:
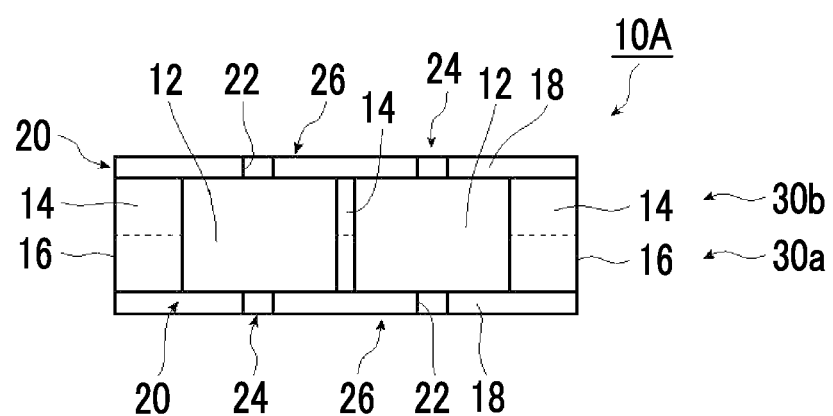
FIG. 4 is a schematic cross-sectional view of another example using the configuration of the soundproof structure shown in FIG. 3.

FIG. 1 is a plan view schematically showing an example of a soundproof structure according to an embodiment of the present invention, and FIG. 2 is a schematic cross-sectional view of the soundproof structure shown in FIG. 1 taken along the line II-II. FIG. 3 is an explanatory view illustrating the configuration of the soundproof structure shown in FIG. 2 using plan views of upper and lower single layer soundproof structures. FIG. 4 is a cross-sectional view schematically showing an example of a soundproof structure according to another embodiment of the present invention shown in the same plan view as the plan view shown in FIG. 1.

A soundproof structure 10 of the present invention shown in FIGS. 1, 2, and 3 is a two-layer laminated soundproof structure in which basic single layer soundproof structures 30a and 30b are laminated, and the single layer soundproof structures 30a and 30b have the same configuration in the illustrated example. Therefore, in the following description, in a case where the two single layer soundproof structures 30a and 30b are the same and it is not necessary to distinguish these from each other, the two single layer soundproof structures 30a and 30b will be collectively described as the single layer soundproof structure 30.

The single layer soundproof structure 30 (30a, 30b) in the illustrated example has: a frame body 16 forming a plurality of frames 14 (in the illustrated example, the same four frames 14) each of which has the same through-hole 12 and which are arranged in a two-dimensional manner; a sheet-shaped film body 20 forming a plurality of films 18 (in the illustrated example, the same four films 18 arranged within the two-dimensional plane) which are fixed to the respective frames 14 so as to cover the through-holes 12 of the respective frames 14; and a plurality of opening portions 24 (in the illustrated example, the same four opening portions 24) each of which includes one or more holes 22 (in the illustrated example, the same one hole 22) drilled so as to penetrate through the film 18 in each frame 14.

Here, the sheet-shaped film body 20 may cover the entire surface of the frame body 16, may cover only a part thereof, or may protrude from the frame body 16.

In the single layer soundproof structure 30, one frame 14, the film 18 fixed to the frame 14, and the opening portion 24 provided in the film 18 form one soundproof cell 26. Therefore, the single layer soundproof structure 30 used in the present invention is formed by a plurality of soundproof cells 26 (in the illustrated example, four soundproof cells 26).

Although the single layer soundproof structure 30 of the illustrated example is formed by a plurality of soundproof cells 26. However, the present invention is not limited thereto, and may be formed by one soundproof cell 26 configured to include one frame 14, one film 18, and one opening portion 24.

In the soundproof structure 10 of the present invention shown in FIG. 2, the single layer soundproof structure 30b is laminated in the same direction on the single layer soundproof structure 30a. In the soundproof structure 10, the frame body 16 of the single layer soundproof structure 30b is attached and fixed to the film 18 of the single layer soundproof structure 30a so that the position of each frame 14 of the single layer soundproof structure 30a and the position of each frame 14 of the single layer soundproof structure 30b match each other. Therefore, a plurality of soundproof cells 26 (in the illustrated example, four soundproof cells 26) of the single layer soundproof structure 30a and a plurality of soundproof cells 26 (in the illustrated example, four soundproof cells 26) of the single layer soundproof structure 30b are laminated so that their two-dimensional planar positions match each other.

In the soundproof structure 10 shown in FIG. 2, the film body 20 forming a plurality of films 18 (in the illustrated example, four films 18) is disposed in a planar shape in two portions of the upper surface of each frame 14 of the frame body 16 of the single layer soundproof structure 30b and an intermediate portion between the lower surface of each frame 14 of the frame body 16 of the single layer soundproof structure 30b and the upper surface of each frame 14 of the frame body 16 of the single layer soundproof structure 30a.

In the illustrated example, the frame body 16 forming each frame 14 of the single layer soundproof structure 30a and the frame body 16 forming each frame 14 of the single layer soundproof structure 30b are separated from each other by the film body 20 forming the film 18. However, as a frame structure in which both the frame bodies 16 are continuous, a configuration in which the film 18 is fixed to the frame body 16 of the continuous frame structure may be adopted.

The soundproof structure 10 shown in FIGS. 1 and 3 may be configured as a soundproof structure 10A according to another embodiment of the present invention shown in FIG. 4. In the soundproof structure 10A, as shown in FIG. 4, the single layer soundproof structure 30b is laminated in the opposite direction on the single layer soundproof structure 30a, the frame body 16 of the single layer soundproof structure 30a and the frame body 16 of the single layer soundproof structure 30b are directly fixed to form a continuous frame structure, and the film body 20 in which each film 18 is formed is fixed to both surfaces of the continuous frame structure. The soundproof structure 10A shown in the cross-sectional view of FIG. 4 is shown by the same plan view as the plan view shown in FIG. 1, and a combination structure of the single layer soundproof structures 30a and 30b shown in FIG. 3 is used.

Figure 5:
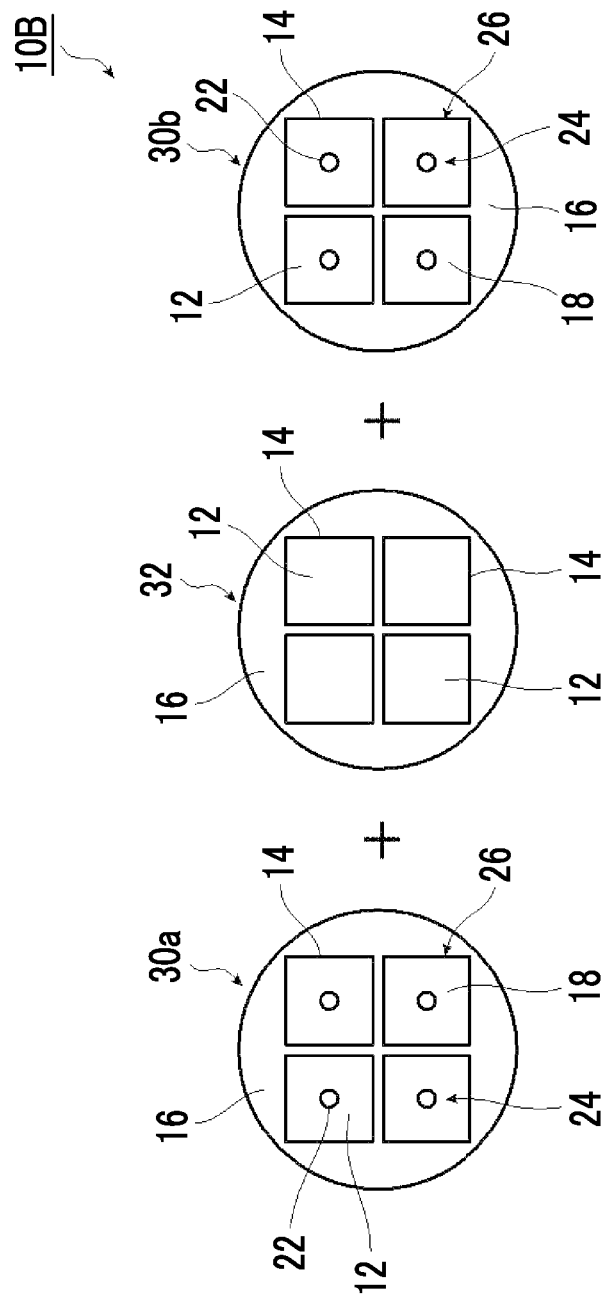
FIG. 5 is an explanatory view illustrating the configuration of a soundproof structure according to another embodiment of the present invention using plan views of upper and lower single layer soundproof structures.

In the present invention, as in a soundproof structure 10B according to another embodiment of the present invention shown in FIG. 5, in order to adjust the inter-film distance between the single layer soundproof structures 30a and 30b, a spacer 32 laminated so as to be inserted between the single layer soundproof structures 30a and 30b.

The spacer 32 shown in FIG. 5 is configured to include the frame body 16 forming a plurality of frames 14 (in the illustrated example, the same four frames 14), which have the same through-hole 12 as in the single layer soundproof structure 30 (30a, 30b) and are arranged in a two-dimensional manner. Unlike in the single layer soundproof structure 30, the film 18 is not fixed to each frame 14.

Figure 6:
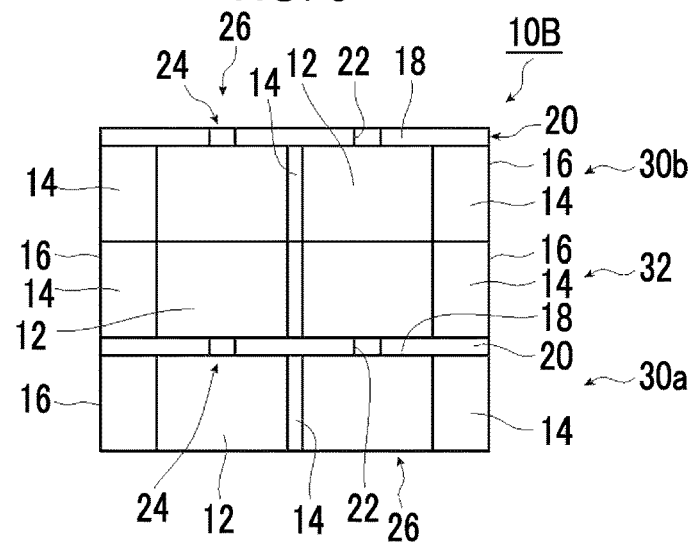
FIG. 6 is a schematic cross-sectional view of an example of the soundproof structure shown in FIG. 5.

As shown in FIG. 6, in such a soundproof structure 10B, the spacer 32 is laminated on the single layer soundproof structure 30a, and the single layer soundproof structure 30b is formed on the laminated spacer 32 in the same direction as the single layer soundproof structure 30a. In the soundproof structure 10B, the frame body 16 of the spacer 32 is attached and fixed to the film 18 of the single layer soundproof structure 30b and the frame body 16 of the single layer soundproof structure 30b is attached and fixed to the frame body 16 of the spacer 32 so that the positions of all frames 14 of the frame bodies 16 of the single layer soundproof structure 30b, the spacer 32, and the single layer soundproof structure 30a match each other. Therefore, also in the soundproof structure 10B, as in the soundproof structures 10 and 10A, a plurality of soundproof cells 26 (in the illustrated example, four soundproof cells 26) of the single layer soundproof structure 30a and a plurality of soundproof cells 26 (in the illustrated example, four soundproof cells 26) of the single layer soundproof structure 30b are laminated so that their two-dimensional positions match each other.

In the soundproof structure 10B shown in FIG. 6, the film body 20 forming a plurality of films 18 (in the illustrated example, four films 18) is disposed in a planar shape in two portions of the upper surface of each frame 14 of the frame body 16 of the single layer soundproof structure 30b and an intermediate portion between the lower surface of each frame 14 of the frame body 16 of the spacer 32 and the upper surface of each frame 14 of the frame body 16 of the single layer soundproof structure 30a.

Figure 7:
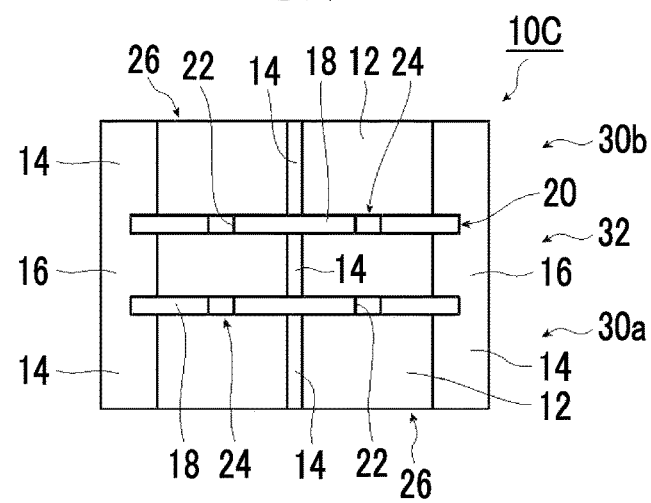
FIG. 7 is a schematic cross-sectional view of another example using the configuration of the soundproof structure shown in FIG. 5.

The soundproof structure 10B shown in FIG. 5 may be configured as a soundproof structure 10C of another embodiment of the present invention shown in FIG. 7. In the soundproof structure 10C, as shown in FIG. 7, the single layer soundproof structure 30a, the spacer 32, and the single layer soundproof structure 30b are laminated in this order so that the spacer 32 is interposed between the films 18 of the single layer soundproof structures 30a and 30b, and the single layer soundproof structures 30a and 30b are laminated in opposite directions. Also in the soundproof structure 10C, as in the soundproof structures 10, 10A, and 10B, the positions of the frames 14 of the single layer soundproof structure 30a, the spacer 32, and the single layer soundproof structure 30b match each other. Therefore, a plurality of soundproof cells 26 (in the illustrated example, four soundproof cells 26) of the single layer soundproof structure 30a and a plurality of soundproof cells 26 (in the illustrated example, four soundproof cells 26) of the single layer soundproof structure 30b are laminated so that their two-dimensional positions match each other.

As in the soundproof structure 10C shown in FIG. 7, as a frame structure in which the frame body 16 of the single layer soundproof structure 30a, the frame body 16 of the spacer 32, and the frame body 16 of the single layer soundproof structure 30b are continuous, two film bodies 20 forming the film 18 may be disposed in the intermediate portion.

Figure 8:
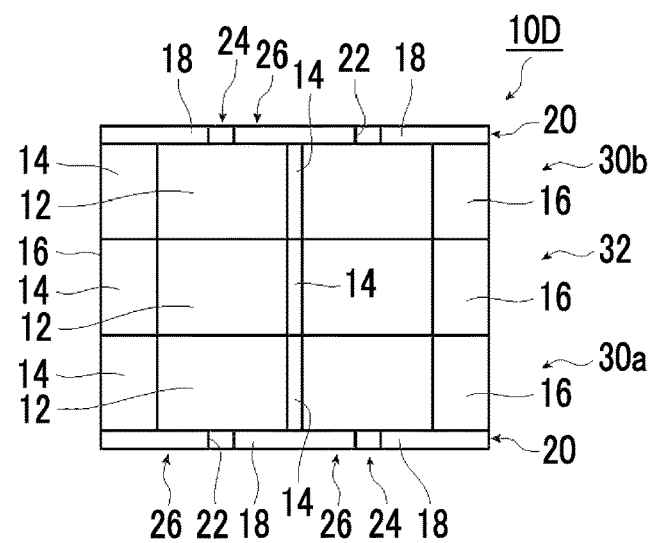
FIG. 8 is a schematic cross-sectional view of another example using the configuration of the soundproof structure shown in FIG. 5.

The soundproof structure 10B shown in FIG. 5 may be configured as a soundproof structure 10D of another embodiment of the present invention shown in FIG. 8. In the soundproof structure 10D, as shown in FIG. 8, the single layer soundproof structure 30a, the spacer 32, and the single layer soundproof structure 30b are laminated in this order so that the spacer 32 is interposed between the frames 14 of the single layer soundproof structures 30a and 30b, and the single layer soundproof structures 30a and 30b are laminated in opposite directions on the side opposite to the soundproof structure 10C shown in FIG. 7. Also in the soundproof structure 10D, as in the soundproof structures 10 and 10A to 10C, the positions of the frames 14 of the single layer soundproof structure 30a, the spacer 32, and the single layer soundproof structure 30b match each other. Therefore, a plurality of soundproof cells 26 (in the illustrated example, four soundproof cells 26) of the single layer soundproof structure 30a and a plurality of soundproof cells 26 (in the illustrated example, four soundproof cells 26) of the single layer soundproof structure 30b are laminated so that their two-dimensional positions match each other.

Also in the soundproof structure 10D shown in FIG. 8, as in the soundproof structure 10C, as a frame structure in which the frame body 16 of the single layer soundproof structure 30a, the frame body 16 of the spacer 32, and the frame body 16 of the single layer soundproof structure 30b are continuous, two film bodies 20 forming the film 18 may be disposed in both the surface portions.

As described above, in at least some of the soundproof cells 26 of the laminated single layer soundproof structure 30 of each laminated soundproof structure of the soundproof structures 10 and 10A to 10D of the present invention, it is preferable that the space between the films 18 of the soundproof cells 26 laminated so as to be adjacent to each other is blocked by the frame 14 of the spacer 32.

In the soundproof structures 10B to 10D described above, as shown in FIG. 5, the spacer 32 having the same through-hole 12 as in the single layer soundproof structure 30 (30*a*, 30*b*) is used. However, the present invention is not limited thereto. Instead of the spacer 32, a peripheral ring-shaped spacer 33 configured to include the cylindrical frame body 16 having the same outer circumference as the single layer soundproof structure 30 may be used as in a soundproof structure shown in FIG. 9.

Figure 10A:
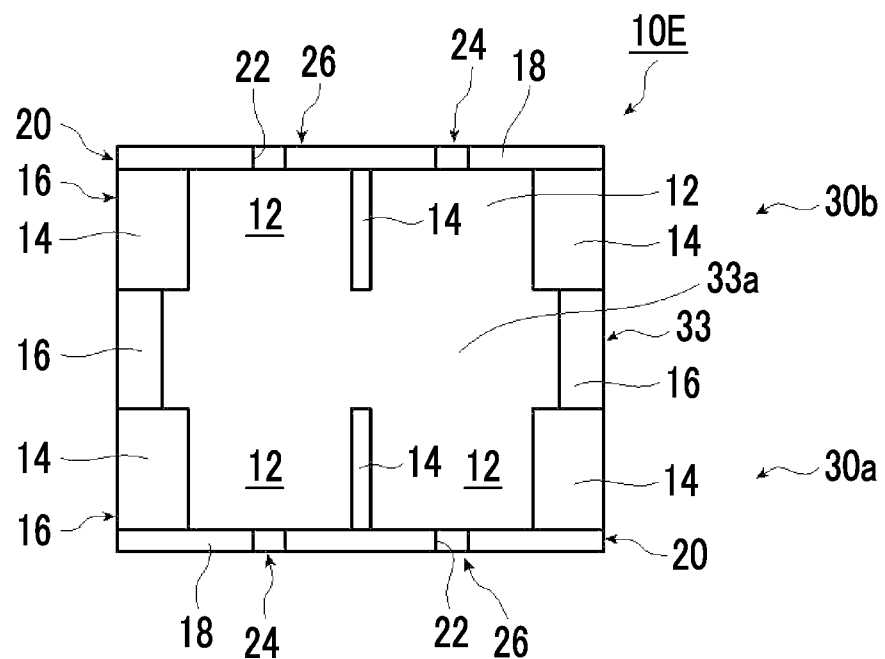
FIG. 10A is a schematic cross-sectional view of an example of the soundproof structure shown in FIG. 9.

In such a soundproof structure having the configuration shown in FIG. 9, as in a soundproof structure 10E shown in FIG. 10A, the single layer soundproof structure 30*a*, the spacer 33, and the single layer soundproof structure 30*b* may be laminated in this order so that the spacer 33 is interposed between the frames 14 of the single layer soundproof structures 30*a* and 30*b*. The spacer 33 has a circular hole 33*a* including the through-holes 12 of four frames 14 of the single layer soundproof structures 30*a* and 30*b*, but does not have the frame 14 passing through the center. Accordingly, unlike in the soundproof structure 10D shown in FIG. 8, the distal end of the frame 14 passing through the centers of the single layer soundproof structures 30*a* and 30*b* is a free edge that is not connected. However, the frame 14 is preferably designed to have sufficient stiffness with respect to the film. In this case, even in a case where the distal end of the frame 14 passing through the centers of the single layer soundproof structures 30*a* and 30*b* is a free edge, the vibration of the frame 14 is sufficiently smaller than the vibration of the film 18 and does not affect interaction with the sound.

Figure 10B:
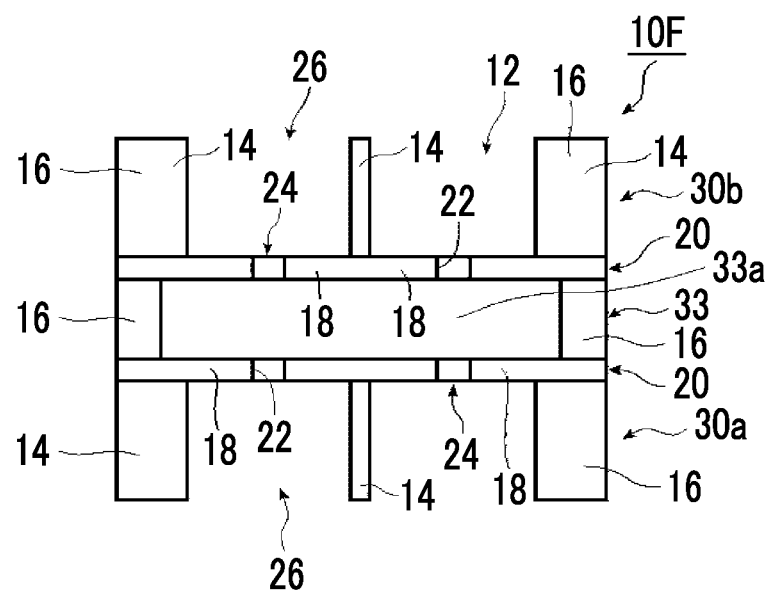
FIG. 10B is a schematic cross-sectional view of another example using the configuration of the soundproof structure shown in FIG. 9.

In the soundproof structure shown in FIG. 9, as in a soundproof structure 10F shown in FIG. 10B, the single layer soundproof structure 30*a*, the spacer 33, and the single layer soundproof structure 30*b* may be laminated in this order so that the spacer 33 is interposed between the film bodies 20, each of which forms the film 18, of the single layer soundproof structures 30*a* and 30*b*. In this case, since there is no frame 14 passing through the center in the spacer 33, the films 18 of the single layer soundproof structures 30*a* and 30*b* are not directly connected to each other unlike in the soundproof structure 10C shown in FIG. 7.

In the above examples, the centers and sizes of the holes 22 or the opening portions 24 drilled in the films 18 of the soundproof cells 26 of the laminated single layer soundproof structures 30 of the laminated soundproof structure match each other, but the present invention is not limited thereto. In at least some of the soundproof cells 26 of the laminated single layer soundproof structures 30, it is preferable that the holes 22 or the opening portions 24 drilled in the films 18 overlap each other. However, since acoustic characteristics as the characteristics of the soundproof cell used in the present invention hardly depend on the position of the hole on the film, the effect is maintained even if the holes do not overlap as viewed from the lamination direction.

In the above examples, only one spacer 32 and one spacer 33 are used between the single layer soundproof structure 30*a* and the single layer soundproof structure 30*b*. However, the present invention is not limited thereto, and one or more spacers may be used according to the inter-film distance between the single layer soundproof structures 30*a* and 30*b*, or the spacers 32 and 33 may be simultaneously used in combination.

In the above examples, the single layer soundproof structure 30 is a two-layer laminated structure of the single layer soundproof structures 30*a* and 30*b*. However, three or more single layer soundproof structures 30 may be laminated. It is needless to say that one or more spacers 32 and 33 may be used to adjust the inter-film distance even in the case of laminating three or more layers.

The laminated structure of the single layer soundproof structure 30 in the soundproof structures 10 and 10A to 10F of the present invention is configured as described above. Hereinafter, in a case where the soundproof structures 10 and 10A to 10F are the same and it is not necessary to distinguish these from each other, the soundproof structures 10 and 10A to 10F will be represented by the soundproof structure 10 of the present invention.

Next, each component of the single layer soundproof structure 30 (30*a*) that forms the soundproof structure of the present invention will be described.

Since the frame 14 is formed so as to annularly surround a thick plate-shaped member 15, has the through-hole 12 thereinside, and fixes the film 18 so as to cover the through-hole 12 on at least one side, the frame 14 serves as a node of film vibration of the film 18 fixed to the frame 14. Therefore, the frame 14 has higher stiffness than the film 18. Specifically, both the mass and the stiffness of the frame 14 per unit area need to be high.

It is preferable that the shape of the frame 14 has a closed continuous shape capable of fixing the film 18 so as to restrain the entire outer periphery of the film 18. However, the present invention is not limited thereto, and the frame 14 may be made to have a discontinuous shape by cutting a part thereof as long as the frame 14 serves as a node of film vibration of the film 18 fixed to the frame 14. That is, since the role of the frame 14 is to fix the film 18 to control the film vibration, the effect is achieved even if there are small cuts in the frame 14 or even if there are very slightly unbonded parts.

The geometric form of the through-hole 12 formed by the frame 14 is a planar shape (in the example shown in FIG. 1, a square). In the present invention, however, the shape of the through-hole 12 is not particularly limited. For example, the shape of the through-hole 12 may be a quadrangle such as a rectangle, a diamond, or a parallelogram, a triangle such as an equilateral triangle, an isosceles triangle, or a right triangle, a polygon including a regular polygon such as a regular pentagon or a regular hexagon, an elliptical shape, and the like, or may be an irregular shape. End portions of the frame 14 on both sides of the through-hole 12 are not blocked and but are open to the outside as they are. The film 18 is fixed to the frame 14 so as to cover the through-hole 12 in at least one opened end portion of the through-hole 12.

The size of the frame 14 is a size in plan view, and can be defined as the size of the through-hole 12. However, in the case of a regular polygon such as a square shown in FIGS. 1 and 3 or a circle, the size of the frame 14 can be defined as a distance between opposite sides passing through the center or as a circle equivalent diameter. In the case of a polygon, an ellipse, or an irregular shape, the size of the frame 14 can be defined as a circle equivalent diameter. In the present invention, the circle equivalent diameter and the radius are a diameter and a radius at the time of conversion into circles having the same area.

In the single layer soundproof structure 30, the size of the frame 14 may be fixed in all frames 14. However, frames having different sizes (including a case where shapes are different) may be included. In this case, the average size of the frames 14 may be used as the size of the frame 14.

The size of the frame 14 is not particularly limited, and may be set according to a soundproofing target to which the soundproof structure 10 of the present invention formed by laminating the single layer soundproof structure 30 is applied, for example, a copying machine, a blower, air conditioning equipment, a ventilator, a pump, a generator, a duct, industrial equipment including various kinds of manufacturing equipment capable of emitting sound such as a coating machine, a rotary machine, and a conveyor machine, transportation equipment such as an automobile, a train, and aircraft, and general household equipment such as a refrigerator, a washing machine, a dryer, a television, a copying machine, a microwave oven, a game machine, an air conditioner, a fan, a PC, a vacuum cleaner, and an air purifier.

The soundproof structure 10 itself can also be used like a partition in order to shield sound from a plurality of noise sources. Also in this case, the size of the frame 14 can be selected from the frequency of the target noise.

Although the details will be described later, it is preferable to reduce the size of the frame 14 in order to obtain the natural vibration mode of the structure configured to include the frame 14 and the film 18 on the high frequency side.

In addition, although the details will be described later, in order to prevent sound leakage due to diffraction at the shielding peak of the soundproof cell 26 due to the opening portion 24 that is provided in the film 18 and is configured to include holes, it is preferable that the average size of the frame 14 is equal to or less than the wavelength size corresponding to a shielding peak frequency to be described later.

For example, the size of the frame 14 is preferably 0.5 mm to 200 mm, more preferably 1 mm to 100 mm, and most preferably 2 mm to 30 mm.

The size of the frame 14 is preferably expressed by an average size, for example, in a case where different sizes are included in each frame 14.

In addition, the width and the thickness of the frame 14 are not particularly limited as long as the film 18 can be fixed so as to be reliably restrained and accordingly the film 18 can be reliably supported. For example, the width and the thickness of the frame 14 can be set according to the size of the frame 14.

For example, in a case where the size of the frame 14 is 0.5 mm to 50 mm, the width of the frame 14 is preferably 0.5 mm to 20 mm, more preferably 0.7 mm to 10 mm, and most preferably 1 mm to 5 mm.

In a case where the ratio of the width of the frame 14 to the size of the frame 14 is too large, the area ratio of the frame 14 with respect to the entire structure increases. Accordingly, there is a concern that the device will become heavy. On the other hand, in a case where the ratio is too small, it is difficult to strongly fix the film with an adhesive or the like in the frame 14 portion.

In a case where the size of the frame 14 exceeds 50 mm and is equal to or less than 200 mm, the width of the frame 14 is preferably 1 mm to 100 mm, more preferably 3 mm to 50 mm, and most preferably 5 mm to 20 mm.

In addition, the thickness of the frame 14 is preferably 0.5 mm to 200 mm, more preferably 0.7 mm to 100 mm, and most preferably 1 mm to 50 mm.

It is preferable that the width and the thickness of the frame 14 are expressed by an average width and an average thickness, respectively, for example, in a case where different widths and thicknesses are included in each frame 14.

In the present invention, it is preferable that a plurality of frames 14, that is, two or more frames 14 are formed as the frame body 16 arranged so as to be connected in a two-dimensional manner, preferably, as one frame body 16.

Here, the number of frames 14 of the single layer soundproof structure 30 used in the soundproof structure 10 of the present invention, that is, the number of frames 14 forming the frame body 16 in the illustrated example, is not particularly limited, and may be set according to the above-described soundproofing target of the soundproof structure 10 of the present invention. Alternatively, since the size of the frame 14 described above is set according to the above-described soundproofing target, the number of frames 14 may be set according to the size of the frame 14.

For example, in the case of in-device noise shielding (reflection and/or absorption), the number of frames 14 is preferably 1 to 10000, more preferably 2 to 5000, and most preferably 4 to 1000.

The reason is as follows. For the size of general equipment, the size of the equipment is fixed. Accordingly, in order to make the size of one soundproof cell 26 suitable for the frequency of noise, it is often necessary to perform shielding (reflection and/or absorption) with the frame body 16 obtained by combining a plurality of soundproof cells 26. In addition, by increasing the number of soundproof cells 26 too much, the total weight is increased by the weight of the frame 14. On the other hand, in a structure such as a partition that is not limited in size, it is possible to freely select the number of frames 14 according to the required overall size.

In addition, since one soundproof cell 26 has one frame 14 as a constitutional unit, the number of frames 14 of the single layer soundproof structure 30, accordingly, the number of frames 14 of the soundproof structure 10 of the present invention can be said to be the number of soundproof cells 26.

The material of the frame 14, that is, the material of the frame body 16, is not particularly limited as long as the material can support the film 18, has a suitable strength in the case of being applied to the above soundproofing target, and is resistant to the soundproof environment of the soundproofing target, and can be selected according to the soundproofing target and the soundproof environment. For example, as materials of the frame 14, metal materials such as aluminum, titanium, magnesium, tungsten, iron, steel, chromium, chromium molybdenum, nichrome molybdenum, and alloys thereof, resin materials such as acrylic resins, polymethyl methacrylate, polycarbonate, polyamideide, polyarylate, polyether imide, polyacetal, polyether ether ketone, polyphenylene sulfide, polysulfone, polyethylene terephthalate, polybutylene terephthalate, polyimide, and triacetyl cellulose, carbon fiber reinforced plastics (CFRP), carbon fiber, and glass fiber reinforced plastics (GFRP) can be mentioned. A plurality of materials of the frame 14 may be used in combination.

Since the film 18 is fixed so as to be restrained by the frame 14 so as to cover the through-hole 12 inside the frame 14, the film 18 vibrates in response to sound waves from the outside. By absorbing or reflecting the energy of sound waves, the sound is insulated. For this reason, it is preferable that the film 18 is impermeable to air.

Incidentally, since the film 18 needs to vibrate with the frame 14 as a node, it is necessary that the film 18 is fixed to the frame 14 so as to be reliably restrained by the frame 14 and accordingly becomes an antinode of film vibration, thereby absorbing or reflecting the energy of sound waves to insulate sound.

For this reason, it is preferable that the film 18 is formed of a flexible elastic material. Therefore, the shape of the film 18 is the shape of the through-hole 12 of the frame 14. In addition, the size of the film 18 is the size of the frame 14. More specifically, the size of the film 18 can be said to be the size of the through-hole 12 of the frame 14.

Figure 11A:
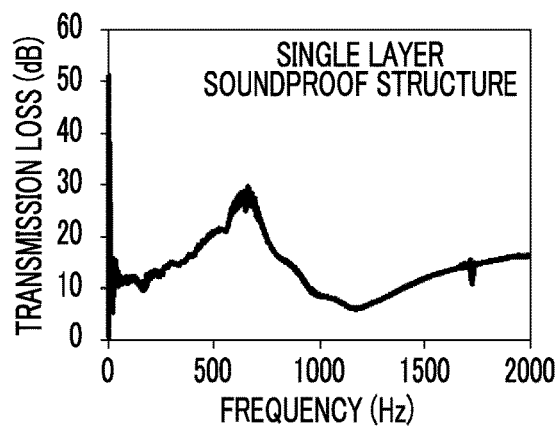
FIG. 11A is a graph showing the sound insulation characteristics expressed by the transmission loss of the single layer soundproof structure, which is used in the soundproof structure according to the present invention, with respect to the frequency.

Here, as shown in FIG. 11A, the film 18 fixed to the frame 14 of the soundproof cell 26 has a first natural vibration frequency at which the transmission loss is minimum, preferably 0 dB, as a resonance frequency that is a frequency of the lowest order natural vibration mode. That is, in the present invention, sound is transmitted at the first natural vibration frequency of the film 18. In the present invention, the first natural vibration frequency is determined by the structure configured to include the frame 14 and the film 18. Therefore, the present inventors have found that the first natural vibration frequency becomes approximately the same value regardless of the presence or absence of the hole 22 drilled in the film 18, accordingly, the presence or absence of the opening portion 24 (refer to JP2015-121994 filed by the present applicant).

Here, the first natural vibration frequency of the film 18, which is fixed so as to be restrained by the frame 14, in the structure configured to include the frame 14 and the film 18 is the frequency of the natural vibration mode at which the sound wave most vibrates the film vibration due to the resonance phenomenon. The sound wave is largely transmitted at the frequency.

According to the finding of the present inventors, in the single layer soundproof structure 30, the hole 22 forming the opening portion 24 is drilled in the film 18 as a through-hole. Therefore, a shielding peak of the sound wave whose transmission loss is a peak (maximum) appears at the shielding peak frequency on the lower frequency side than the first natural vibration frequency. In particular, on the lower frequency side than the peak of shielding caused by the through-hole 22, an increase in sound absorption due to the presence of the through-hole 22 appears.

Accordingly, in the single layer soundproof structure 30, the shielding (transmission loss) becomes a peak (maximum) at the shielding peak frequency. As a result, it is possible to selectively insulate sound in a certain frequency band centered on the shielding peak frequency.

In the present invention, first, it is possible to increase the shielding of sound and to control the peak of shielding. In addition to these features, there is a feature that the absorption of sound (energy of sound waves) appears on the lower frequency side due to the effect of the through-hole 22.

For example, in the example shown in FIG. 11A, the first natural vibration frequency is 1160 Hz in the audible range, and the peak of shielding at which the transmission loss is a peak value of 28 dB is shown at 664 Hz that is a shielding peak frequency on the lower frequency side. Therefore, it is possible to selectively insulate sound in a predetermined frequency band centered on 664 Hz in the audible range.

In addition, a method of measuring the transmission loss (dB) in the single layer soundproof structure 30 and the soundproof structure of the present invention will be described later.

Therefore, in order to set the shielding peak frequency depending on the opening portion 24 configured to include one or more holes 22 to an arbitrary frequency within the audible range in the structure configured to include the frame 14 and the film 18, it is important to obtain the natural vibration mode on the high frequency side if possible. In particular, this is practically important. For this reason, it is preferable to make the film 18 thick, it is preferable to increase the Young's modulus of the material of the film 18, and it is preferable to reduce the size of the frame 14, accordingly, the size of the film 18 as described above. That is, in the present invention, these preferable conditions are important.

Therefore, since the single layer soundproof structure 30 complies with the stiffness law. In order to shield sound waves at frequencies lower than the first natural vibration frequency of the film 18 fixed to the frame 14, the first natural vibration frequency of the film 18 is preferably 10 Hz to 100000 Hz corresponding to the sound wave sensing range of a human being, more preferably 20 Hz to 20000 Hz that is the audible range of sound waves of a human being, even more preferably 40 Hz to 16000 Hz, most preferably 100 Hz to 12000 Hz.

The thickness of the film 18 is not particularly limited as long as the film can vibrate by absorbing or reflecting the energy of sound waves to insulate sound. However, it is preferable to make the film 18 thick in order to obtain a natural vibration mode on the high frequency side. In the present invention, for example, the thickness of the film 18 can be set according to the size of the frame 14, that is, the size of the film.

For example, in a case where the size of the frame 14 is 0.5 mm to 50 mm, the thickness of the film 18 is preferably 0.005 mm (5 μm) to 5 mm, more preferably 0.007 mm (7 μm) to 2 mm, and most preferably 0.01 mm (10 μm) to 1 mm.

In a case where the size of the frame 14 exceeds 50 mm and is equal to or less than 200 mm, the thickness of the film 18 is preferably 0.01 mm (10 μm) to 20 mm, more preferably 0.02 mm (20 μm) to 10 mm, and most preferably 0.05 mm (50 μm) to 5 mm.

The thickness of the film 18 is preferably expressed by an average thickness, for example, in a case where the thickness of one film 18 is different or in a case where different thicknesses are included in each film 18.

In the single layer soundproof structure 30, the first natural vibration frequency of the film 18 in the structure configured to include the frame 14 and the film 18 can be determined by the geometric form of the frame 14 of a plurality of soundproof cells 26, for example, the shape and size of the frame 14, and the stiffness of the film of the plurality of soundproof cells 26, for example, thickness and flexibility of the film.

As a parameter characterizing the first natural vibration mode of the film 18, in the case of the film 18 of the same material, a ratio between the thickness (t) of the film 18 and the square of the size (a) of the frame 14 can be used. For example, in the case of a square, a ratio $[a^2/t]$ between the size of one side and the square (t) of the size (a) of the frame 14 can be used. In a case where the ratio $[a^2/t]$ is the same, for example, in a case where (t, a) is (50 μm, 7.5 mm) and a case where (t, a) is (200 μm, 15 mm), the first natural vibration mode is the same frequency, that is, the same first natural vibration frequency. That is, by setting the ratio $[a^2/t]$ to a fixed value, the scale law is established. Accordingly, an appropriate size can be selected.

The Young's modulus of the film 18 is not particularly limited as long as the film has elasticity capable of vibrating in order to insulate sound by absorbing or reflecting the energy of sound waves. However, it is preferable to set the Young's modulus of the film 18 to be large in order to obtain a natural vibration mode on the high frequency side. For example, the Young's modulus of the film 18 can be set according to the size of the frame 14, that is, the size of the film in the present invention.

For example, the Young's modulus of the film 18 is preferably 1000 Pa to 3000 GPa, more preferably 10000 Pa to 2000 GPa, and most preferably 1 MPa to 1000 GPa.

The density of the film 18 is not particularly limited either as long as the film can vibrate by absorbing or reflecting the energy of sound waves to insulate sound. For example, the density of the film 18 is preferably 10 kg/m$^3$ to 30000 kg/m$^3$, more preferably 100 kg/m$^3$ to 20000 kg/m$^3$, and most preferably 500 kg/m$^3$ to 10000 kg/m$^3$.

In a case where a film-shaped material or a foil-shaped material is used as a material of the film 18, the material of the film 18 is not particularly limited as long as the material has a strength in the case of being applied to the above soundproofing target and is resistant to the soundproof environment of the soundproofing target so that the film 18 can vibrate by absorbing or reflecting the energy of sound waves to insulate sound, and can be selected according to the soundproofing target, the soundproof environment, and the like. Examples of the material of the film 18 include resin materials that can be made into a film shape such as polyethylene terephthalate (PET), polyimide, polymethylmethacrylate, polycarbonate, acrylic (PMMA), polyamideide, polyarylate, polyetherimide, polyacetal, polyetheretherketone, polyphenylene sulfide, polysulfone, polyethylene terephthalate, polybutylene terephthalate, polyimide, triacetyl cellulose, polyvinylidene chloride, low density polyethylene, high density polyethylene, aromatic polyamide, silicone resin, ethylene ethyl acrylate, vinyl acetate copolymer, polyethylene, chlorinated polyethylene, polyvinyl chloride, polymethyl pentene, and polybutene, metal materials that can be made into a foil shape such as aluminum, chromium, titanium, stainless steel, nickel, tin, niobium, tantalum, molybdenum, zirconium, gold, silver, platinum, palladium, iron, copper, and permalloy, fibrous materials such as paper and cellulose, and materials or structures capable of forming a thin structure such as a nonwoven fabric, a film containing nano-sized fiber, porous materials including thinly processed urethane or synthrate, and carbon materials processed into a thin film structure.

The film 18 may be individually fixed to each of the plurality of frames 14 of the frame body 16 of the single layer soundproof structure 30 to form the sheet-shaped film body 20 as a whole. Conversely, each film 18 covering each frame 14 may be formed by one sheet-shaped film body 20 fixed so as to cover all the frames 14. That is, a plurality of films 18 may be formed by one sheet-shaped film body 20 covering a plurality of frames 14. Alternatively, the film 18 covering each frame 14 may be formed by fixing a sheet-shaped film body to a part of the frame 14 so as to cover some of the plurality of frames 14, and the sheet-shaped film body 20 covering all of the plurality of frames 14 (all frames 14) may be formed by using some of these sheet-shaped film bodies.

In addition, the film 18 is fixed to the frame 14 so as to cover an opening on at least one side of the through-hole 12 of the frame 14. That is, the film 18 may be fixed to the frame 14 so as to cover openings on one side, the other side, or both sides of the through-hole 12 of the frame 14.

Here, all the films 18 may be provided on the same side of the through-holes 12 of the plurality of frames 14 of the single layer soundproof structure 30. Alternatively, some of the films 18 may be provided on one side of each of some of the through-holes 12 of the plurality of frames 14, and the remaining films 18 may be provided on the other side of each of the remaining some through-holes 12 of the plurality of frames 14.

The method of fixing the film 18 to the frame 14 is not particularly limited. Any method may be used as long as the film 18 can be fixed to the frame 14 so as to serve as a node of film vibration. For example, a method using an adhesive, a method using a physical fixture, and the like can be mentioned.

In the method of using an adhesive, an adhesive is applied onto the surface of the frame 14 surrounding the through-hole 12 and the film 18 is placed thereon, so that the film 18 is fixed to the frame 14 with the adhesive. Examples of the adhesive include epoxy-based adhesives (Araldite (registered trademark) (manufactured by Nichiban Co., Ltd.) and the like), cyanoacrylate-based adhesives (Aron Alpha (registered trademark) (manufactured by Toagosei Co., Ltd.) and the like), and acrylic-based adhesives.

As a method using a physical fixture, a method can be mentioned in which the film 18 disposed so as to cover the through-hole 12 of the frame 14 is interposed between the frame 14 and a fixing member, such as a rod, and the fixing member is fixed to the frame 14 by using a fixture, such as a screw.

In the film 18, that is, in the soundproof cell 26, the opening portion 24 configured to include one or more holes 22 is provided.

In the present invention, as shown in FIG. 11, the single layer soundproof structure 30 has the opening portion 24 configured to include of one or more holes 22 drilled in the film 18. Accordingly, the soundproof structure 10 has a peak of transmission loss, at which shielding is a peak (maximum), on the lower frequency side than the first natural vibration frequency of the film 18, and the frequency at which the shielding (transmission loss) is a peak (maximum) is called a shielding peak frequency.

The shielding peak frequency appears due to the hole 22 of the opening portion 24 on the lower frequency side than the first natural vibration frequency that mainly depends on the film 18 of the soundproof cell 26 of the single layer soundproof structure 30. The shielding peak frequency is determined according to the size of the opening portion 24 with respect to the size of the frame 14 (or the film 18), specifically, the opening ratio of the opening portion 24 that is the ratio of the total area of the hole 22 to the area of the through-hole 12 (or the film 18 that covers the through-hole 12) of the frame 14.

Here, as shown in FIGS. 1 to 8, one or more holes 22 may be drilled in the film 18 that covers the through-hole 12 of the soundproof cell 26. As shown in FIGS. 1, 3, and 5, the drilling position of the hole 22 may be the middle of the soundproof cell 26 or the film 18 (hereinafter, represented by the soundproof cell 26). However, the present invention is not limited thereto, the drilling position of the hole 22 does not need to be the middle of the soundproof cell 26, and the hole 22 may be drilled at any position.

That is, the sound insulation characteristics of the single layer soundproof structure 30 are not changed simply by changing the drilling position of the hole 22.

In the present invention, however, it is preferable that the through-hole 22 is drilled in a region within a range away from the fixed end of the peripheral portion of the through-hole 12 more than 20% of the size of the surface of the film 18. Most preferably, the through-hole 22 is provided at the center of the film 18.

As shown in FIGS. 1, 3, and 5, the number of holes 22 forming the opening portion 24 in the soundproof cell 26 may be one for one soundproof cell 26. However, the present invention is not limited thereto, and two or more (that is, a plurality of) holes 22 may be provided.

In the single layer soundproof structure 30, accordingly, the soundproof structure 10 of the present invention, from the viewpoint of air permeability, as shown in FIGS. 1, 3, and 5, it is preferable that the opening portion 24 of each soundproof cell 26 is formed by one hole 22. The reason is that, in the case of a fixed opening ratio, the easiness of passage of air as wind is large in a case where one hole is large and the influence of viscosity at the boundary is small.

On the other hand, in a case where there is a plurality of holes 22 in one soundproof cell 26, the sound insulation characteristics of the single layer soundproof structure 30 indicate sound insulation characteristics corresponding to the total area of the plurality of holes 22, that is, the area of the opening portion 24. That is, the sound insulation characteristics of the soundproof structure 10 of the present invention indicate a corresponding sound insulation peak (shielding peak) at the corresponding sound insulation peak frequency (shielding peak frequency). Therefore, it is preferable that the area of the opening portion 24, which is the total area of the plurality of holes 22 in one soundproof cell 26 (or the film 18) is equal to the area of the opening portion 24, which is the area of one hole 22 that is only provided in another soundproof cell 26 (or the film 18). However, the present invention is not limited thereto.

In a case where the opening ratio of the opening portion 24 in the soundproof cell 26 (the area ratio of the opening portion 24 to the area of the film 18 covering the through-hole 12 (the ratio of the total area of all the holes 22)) is the same, the same single layer soundproof structure 30 is obtained with the single hole 22 and the plurality of holes 22. Accordingly, even if the size of the hole 22 is fixed to any size, it is possible to manufacture soundproof structures corresponding to various frequency bands.

In the present invention, the opening ratio (area ratio) of the opening portion 24 in the soundproof cell 26 is not particularly limited, and may be set according to the sound insulation frequency band to be selectively insulated. The opening ratio (area ratio) of the opening portion 24 in the soundproof cell 26 is preferably 0.000001% to 70%, more preferably 0.000005% to 50%, and most preferably 0.00001% to 30%. By setting the opening ratio of the opening portion 24 within the above range, it is possible to determine the sound insulation peak frequency, which is the center of the sound insulation frequency band to be selectively insulated, and the transmission loss at the sound insulation peak.

From the viewpoint of manufacturing suitability, it is preferable that the single layer soundproof structure 30 has a plurality of holes 22 of the same size in one soundproof cell 26. That is, it is preferable that the opening portion 24 of soundproof cell 26 is configured to include a plurality of holes 22 of the same size.

In addition, in the single layer soundproof structure 30, it is preferable that the holes 22 forming the opening portions 24 of all the soundproof cells 26 have the same size.

In the present invention, it is preferable that the hole 22 is drilled using a processing method for absorbing energy, for example, laser processing, or it is preferable that the hole 22 is drilled using a mechanical processing method based on physical contact, for example, punching or needle processing.

Therefore, in a case where a plurality of holes 22 in one soundproof cell 26 or one or a plurality of holes 22 in all the soundproof cells 26 are made to have the same size, in the case of drilling holes by laser processing, punching, or needle processing, it is possible to continuously drill holes without changing the setting of a processing apparatus or the processing strength.

In addition, in the single layer soundproof structure 30, the size of the hole 22 in the soundproof cell 26 (or the film 18) may be different for each soundproof cell 26 (or the film 18). In a case where there are holes 22 having different sizes for each soundproof cell 26 (or the film 18) as described above, sound insulation characteristics corresponding to the average area of the areas of the holes 22, that is, a corresponding sound insulation peak at the corresponding sound insulation peak frequency is shown.

In addition, it is preferable that 70% or more of the opening portion 24 of each soundproof cell 26 of the single layer soundproof structure 30 is formed by holes having the same size.

The size of the hole 22 forming the opening portion 24 may be any size as long as the hole 22 can be appropriately drilled by the above-described processing method, and is not particularly limited.

However, from the viewpoint of processing accuracy of laser processing such as accuracy of laser diaphragm, processing accuracy of punching or needle processing, manufacturing suitability such as easiness of processing, and the like, the size of the hole 22 on the lower limit side thereof is preferably 2 μm or more, more preferably 5 μm or more, and most preferably 10 μm or more.

The upper limit of the size of the hole 22 needs to be smaller than the size of the frame 14. Therefore, normally, in a case where the size of the frame 14 is set to the order of mm and the size of the hole 22 is set to the order of μm, the upper limit of the size of the hole 22 does not exceed the size of the frame 14. In a case where the upper limit of the size of the hole 22 exceeds the size of the frame 14, the upper limit of the size of the hole 22 may be set to be equal to or less than the size of the frame 14.

The single layer soundproof structure used in the present invention is basically configured as described above.

Incidentally, the soundproof structure of the present invention is a laminated soundproof structure formed by laminating a plurality of layers of the single layer soundproof structures described above, so that it is possible to realize extremely strong soundproofing performance or widening of sound insulation according to the inter-film distance of the laminated soundproof structure and the shielding frequency can be easily adjusted according to noise.

In the related art, a single layer soundproof structure having a soundproof cell including a frame, a film, and a hole (opening portion) has a large feature in that it is possible to shield a specific sound while maintaining air permeability or thermal conductivity. In the soundproof structure of the present invention, however, by laminating a single layer soundproof structure having such a feature and having the same conditions of a frame, a film, and a hole (opening portion), this feature is further extended to improve the sound insulation performance.

In the present invention, in a case where the conditions of the frame, the film, and the hole (opening portion) are the same, the average of the shift amount of the first natural vibration frequency and the shielding peak frequency of the acoustic spectrum (transmission loss spectrum) between the soundproof cells of the laminated single layer soundproof structure of the laminated soundproof structure is preferably 10% or less, more preferably 8% or less, and even more preferably 5% or less.

The reason why the average of the shift amount is limited to the above range is as follows. In order to obtain the effect of the present invention, it is ideal that both the above-described frequencies match each other and the shielding peak and the natural vibration frequency match each other. Accordingly, in a case where the average value of the shift amount exceeds 10%, since there is a large difference between the characteristics of soundproof structures of respective laminated layers, the effect of the laminated soundproof structure in the present invention cannot be obtained.

In a case where the soundproof cells of each single layer soundproof structure of the laminated soundproof structure are a plurality of soundproof cells arranged in a two-dimensional manner, it is more preferable that 60% or more of the laminated soundproof cells is configured to include a frame, a film, and a hole (opening portion) having the same size. For example, in the soundproof structure of the present invention, it is most preferable to use a soundproof cell in which a frame, a film, and a hole (opening portion) have the same size.

Figure 20:
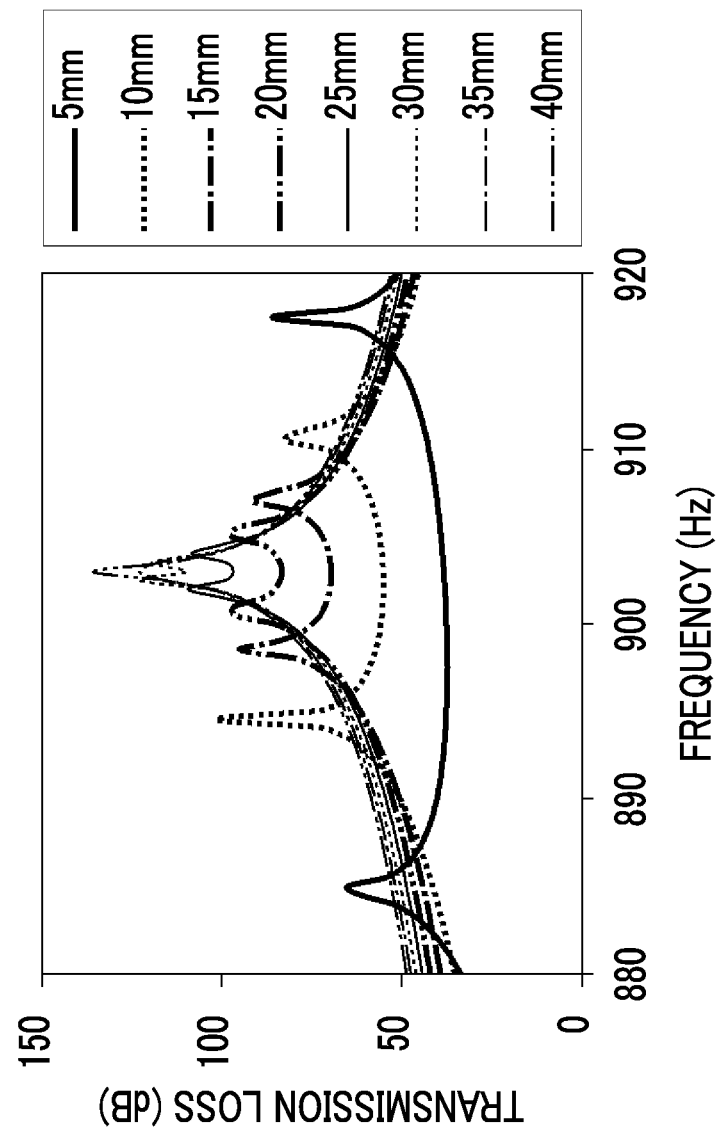
FIG. 20 is a graph showing changes in two peaks of the transmission loss with respect to the frequency in a case where the inter-film distance between two layers of an example of the soundproof structure of the present invention is changed.
Figure 22:
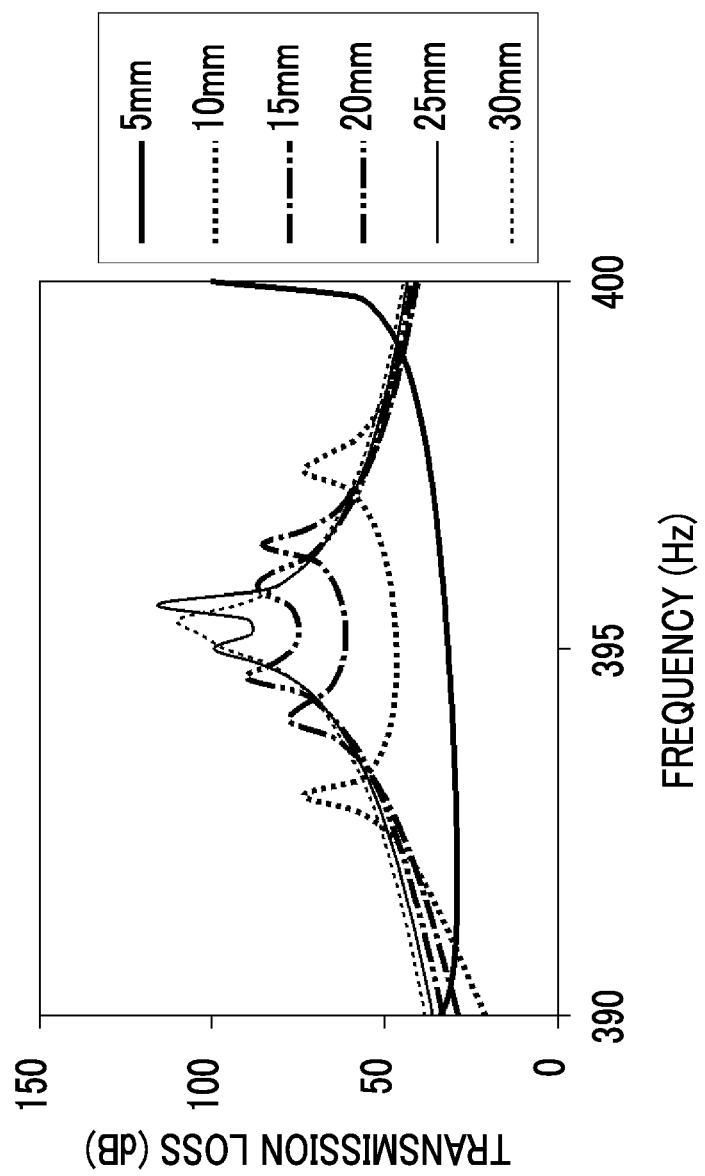
FIG. 22 is a graph showing changes in two peaks of the transmission loss with respect to the frequency in a case where the inter-film distance between two layers of another example of the soundproof structure of the present invention is changed.

In the soundproof structure 10 of the present invention, as shown in FIGS. 12A, 13A, 14A, 15A, 16A, and 17A showing the transmission loss of examples to be described later and FIGS. 20 and 22 showing the transmission loss based on the simulation to be described later, the laminated soundproof structure has one or more minimum values at which the transmission loss is minimized due to natural vibration of the laminated soundproof cell 26. Preferably, one or more maximum values, which are determined by an opening portion 24 of the laminated soundproof cell 26 and at which the transmission loss is maximized, are present on the lower frequency side than one or more minimum frequencies corresponding to the one or more minimum values, that is, the resonance frequency, for example, on the lower frequency side than the first resonance frequency corresponding to the minimum value of the lowest frequency. In addition, it is preferable to have one or more lamination shielding peak frequencies corresponding to the one or more maximum values. The one or more lamination shielding peak frequencies are shielding peak frequencies of the laminated soundproof structures of the soundproof structure 10 of the present invention. In the soundproof structure 10 of the present invention, it is possible to selectively insulate sound in a frequency band centered on the lamination shielding peak frequency.

Incidentally, since the wavelength of the sound is in the order of several centimeters to several meters, sufficient interference occurs at the normal inter-film distance of the soundproof structure of the present invention, for example, the inter-film distance between two layers.

Therefore, in the soundproof structure of the present invention, the shielding peak changes with the inter-film distance between two layers, and there are the following features.

1. In a case where the inter-film distance is long, it is possible to realize extremely strong soundproofing performance, such as the addition of the sound insulation performance of single layer soundproof structures each having a soundproof cell including a frame, a film, and a hole (opening portion) at the decibel (dB) level. The effect in a case where the inter-film distance is long is also useful from the viewpoint of practicability because a sufficient effect can be obtained at the inter-film distance of about 1 cm. Assuming that the wavelength of the maximum value of the transmission loss is $\lambda$, the upper limit value in a case where the inter-film distance is long is preferably $10\lambda$ or less, more preferably $5\lambda$ or less, and even more preferably $1\lambda$ or less.

Figure 13A:
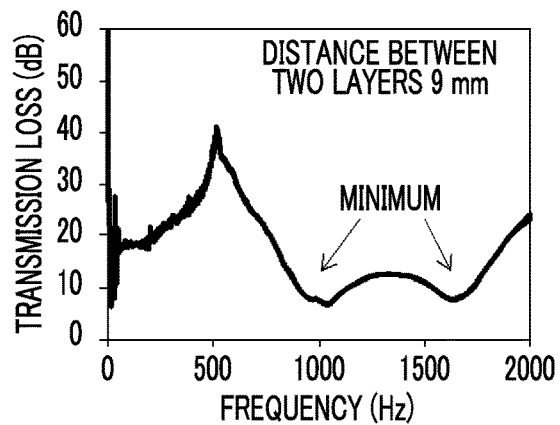
FIG. 13A is a graph showing the sound insulation characteristics of a soundproof structure of Example 2 of the present invention.
Figure 14A:
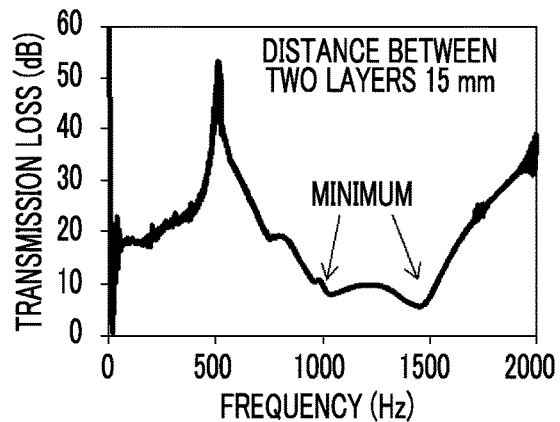
FIG. 14A is a graph showing the sound insulation characteristics of a soundproof structure of Example 3 of the present invention.

That is, as shown in FIGS. 13A and 14A described above, in such a case, in the soundproof structure 10 of the present invention, it is preferable that the peak of shielding, which is one or more maximum values of the transmission loss of the single layer soundproof structure, has a larger value than the peak of shielding, which is a maximum value of the transmission loss of the laminated soundproof structure shown in FIG. 11A, by laminating the single layer soundproof structure 30 in two layers. As a result, in the soundproof structure 10 of the present invention, it is possible to realize stronger sound insulation.

2. in a case where the inter-film distance is short, the resonances of the single layer soundproof structures 30 of two layers interact with each other, and the sound insulation peak is divided so that the width of the sound insulation frequency band increases.

That is, as shown in FIGS. 12A, 15A, 16A, 17A, 20, and 22 described above, in the soundproof structure 10 of the present invention, due to interaction between natural vibrations of the soundproof cells 26 of the single layer soundproof structures 30 laminated in two layers of the laminated soundproof structure, there are two or more maximum values, which are determined on the lower frequency side than the first natural vibration frequency of the two laminated single layer soundproof structures 30 and/or the first resonance frequency of the laminated soundproof structure and at which the transmission loss is maximized, due to the hole 22 or the opening portion 24 of the laminated soundproof cell 26. It is preferable to have two or more lamination shielding peak frequencies corresponding to the two or more maximum values. These two or more lamination shielding peak frequencies are shielding peak frequencies of the laminated soundproof structure of the soundproof structure 10 of the present invention. Accordingly, since it is possible to selectively insulate sound in a frequency band centered on the lamination shielding peak frequency, it is possible to increase the width of the sound insulation frequency band.

In the present invention, the case where the inter-film distance is short refers to a case where the spectrum of the transmission loss is measured and division is observed at the peak of the transmission loss, and the case where the inter-film distance is long refers to a case where the peak of the transmission loss is a single peak.

As shown in FIGS. 20 and 22 described above, in the soundproof structure 10 of the present invention, it is preferable that two or more lamination shielding peak frequencies corresponding to two or more maximum values become closer to each other as the inter-film distance between the two laminated single layer soundproof structures 30 of the laminated soundproof structure becomes larger.

Figure 21:
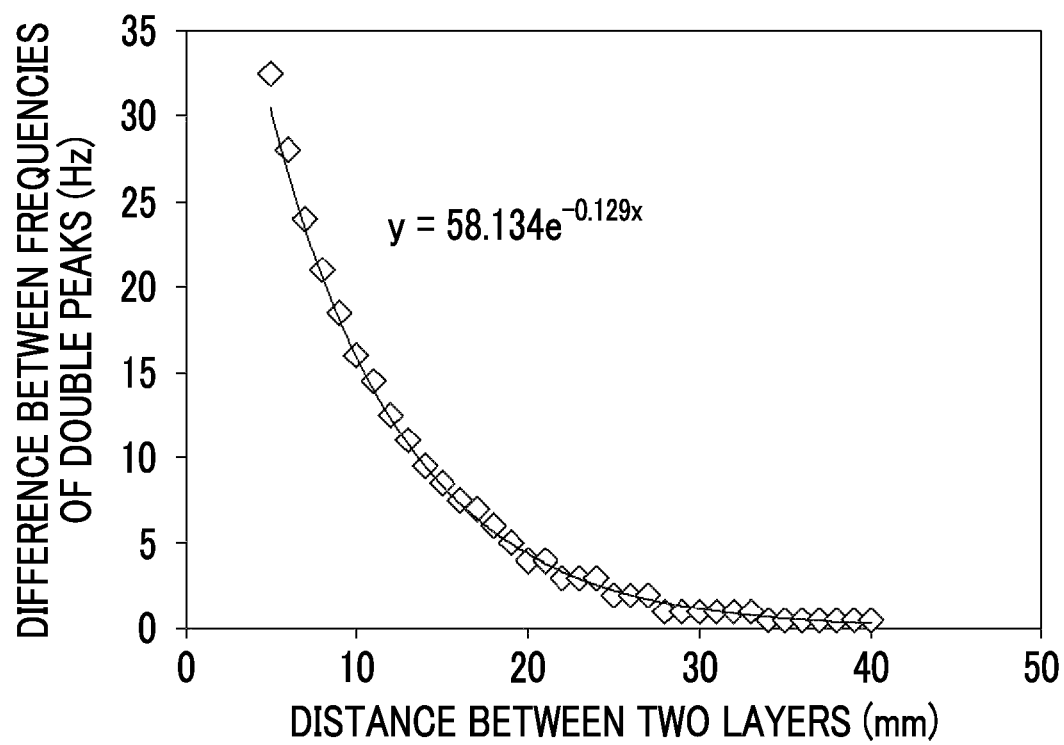
FIG. 21 is a graph showing the difference between the frequencies of two peaks with respect to the inter-film distance between two layers of the soundproof structure of the present invention shown in FIG. 20.
Figure 23:
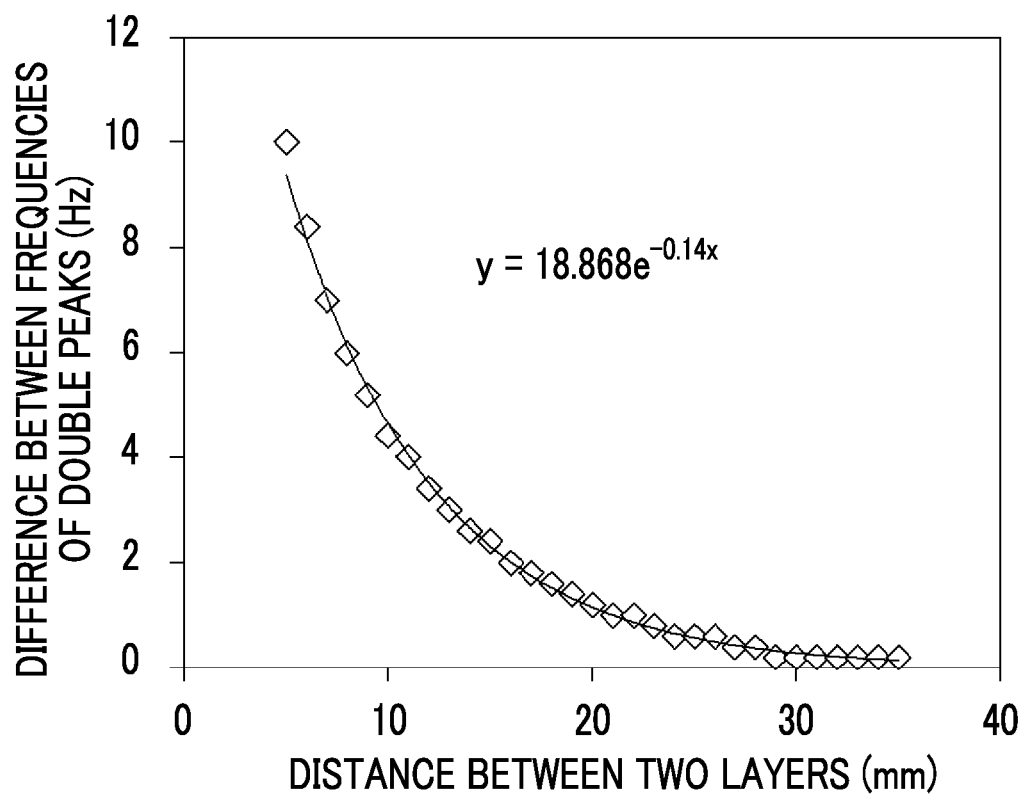
FIG. 23 is a graph showing the difference between the frequencies of two peaks with respect to the inter-film distance between two layers of the soundproof structure of the present invention shown in FIG. 22.

Here, as shown in FIGS. 21 and 23 showing the transmission loss based on the simulation to be described later, assuming that the inter-film distance is a (mm), the difference between these two or more lamination shielding peak frequencies can be expressed by the following Equation (1).

$$Df = C \times \exp(-b \times a) \quad (1)$$

Here, it is preferable that b and c are constants and the constant b is a value within the range of 0.1 to 0.2.

In the soundproof structure 10 of the present invention, it is preferable that the inter-film distance between the two laminated single layer soundproof structures 30 of the laminated soundproof structure is less than the wavelength (size) of the shielding peak at which the transmission loss is maximized.

In the laminated soundproof structure of the soundproof structure of the present invention, as viewed from the whole sound transmission loss spectrum, there are excellent characteristics different from the single layer soundproof structure as shown below.

1. By interaction due to a reduction in the distance between the films 18 of the soundproof cells 26 of the two single layer soundproof structures 30, the first resonance frequency of the laminated soundproof structure is divided into two, and two minimum values of transmission loss appear. Since sound is greatly absorbed by film vibration at a frequency at which the transmission loss is a minimum value, the absorption peak of the sound can be shifted simply by controlling the distance between the films 18, that is, the inter-film distance between the two laminated single layer soundproof structures 30.

That is, as shown in FIGS. 13A, 13B, 14A, 14B, 15A, 15B, 17A, 17B, 18, and 19 showing the transmission loss and the sound absorbance (sound absorption rate) of examples to be described later, in the soundproof structure 10 of the present invention, due to interaction between the natural vibrations of the soundproof cells 26 of the single layer soundproof structures 30 laminated in two layers of the laminated soundproof structure, there are two or more minimum values at which the transmission loss is minimized corresponding to the first natural vibration frequency of the two laminated single layer soundproof structures 30, and there are two or more minimum frequencies (resonance frequencies) corresponding to the two or more minimum values. Therefore, due to film vibration at these frequencies, it is possible to have two or more maximum values at which the sound absorbance is maximized corresponding to the first natural vibration frequency of the two laminated single layer soundproof structures 30, and it is possible to have two or more maximum frequencies corresponding to the two or more maximum values.

In this case, as shown in FIGS. 13A, 13B, 14A, and 14B, in the laminated soundproof structure of the soundproof structure 10 of the present invention, it is more preferable that two or more minimum frequencies (resonance frequencies) corresponding to two or more minimum values of the transmission loss become closer to each other and as a result two or more maximum frequencies corresponding to two or more maximum values of the sound absorbance become closer to each other as the inter-film distance between the two laminated single layer soundproof structures 30 becomes larger.

2. A minimum value of the transmission loss due to the hole 22 (opening portion 24) appears on the lower frequency side than the maximum value of the transmission loss in the laminated soundproof structure. Absorption is maximized at the frequency, and the laminated soundproof structure functions as an efficient sound absorption structure on the low frequency side.

Figure 15A:
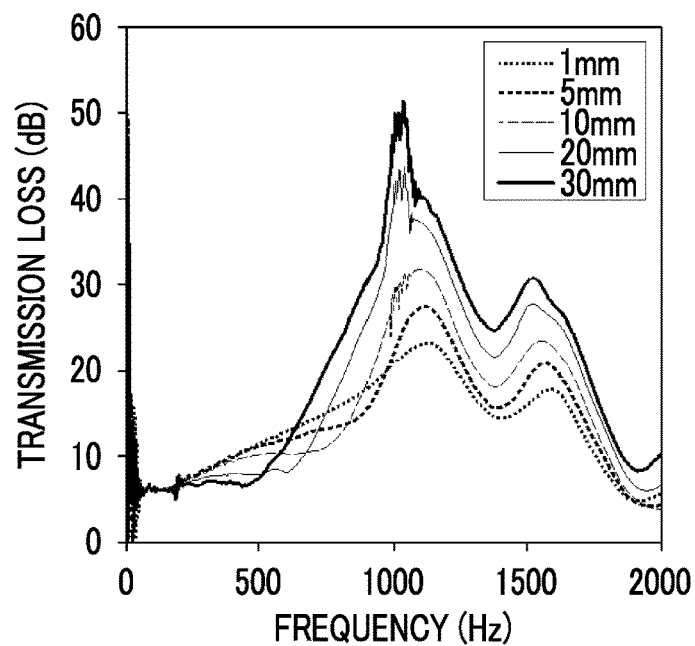
FIG. 15A is a graph showing the sound insulation characteristics of soundproof structures of Examples 4 to 8 of the present invention.
Figure 15B:
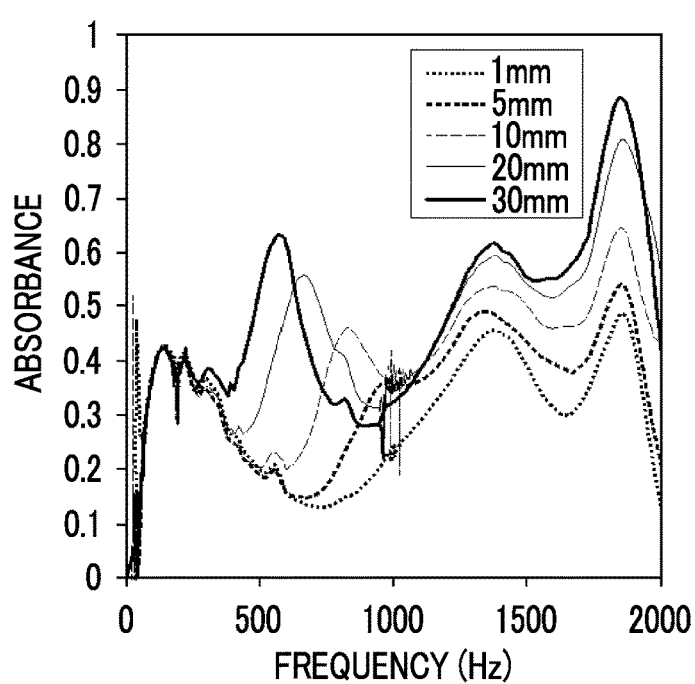
FIG. 15B is a graph showing the sound absorption characteristics of the soundproof structures of Examples 4 to 8 of the present invention.

That is, as shown in FIGS. 15A and 15B, in the soundproof structure 10 of the present invention, it is preferable to have a maximum value of the absorbance on the lower frequency side than the maximum value of the transmission loss on the lower frequency side than the first natural vibration frequency of the two laminated single layer soundproof structures 30 and/or the first resonance frequency of the laminated soundproof structure, which is determined by the hole 22 (opening portion 24) of the soundproof cell 26 of the laminated single layer soundproof structure 30, by laminating the single layer soundproof structure 30 in two layers.

Figure 26:
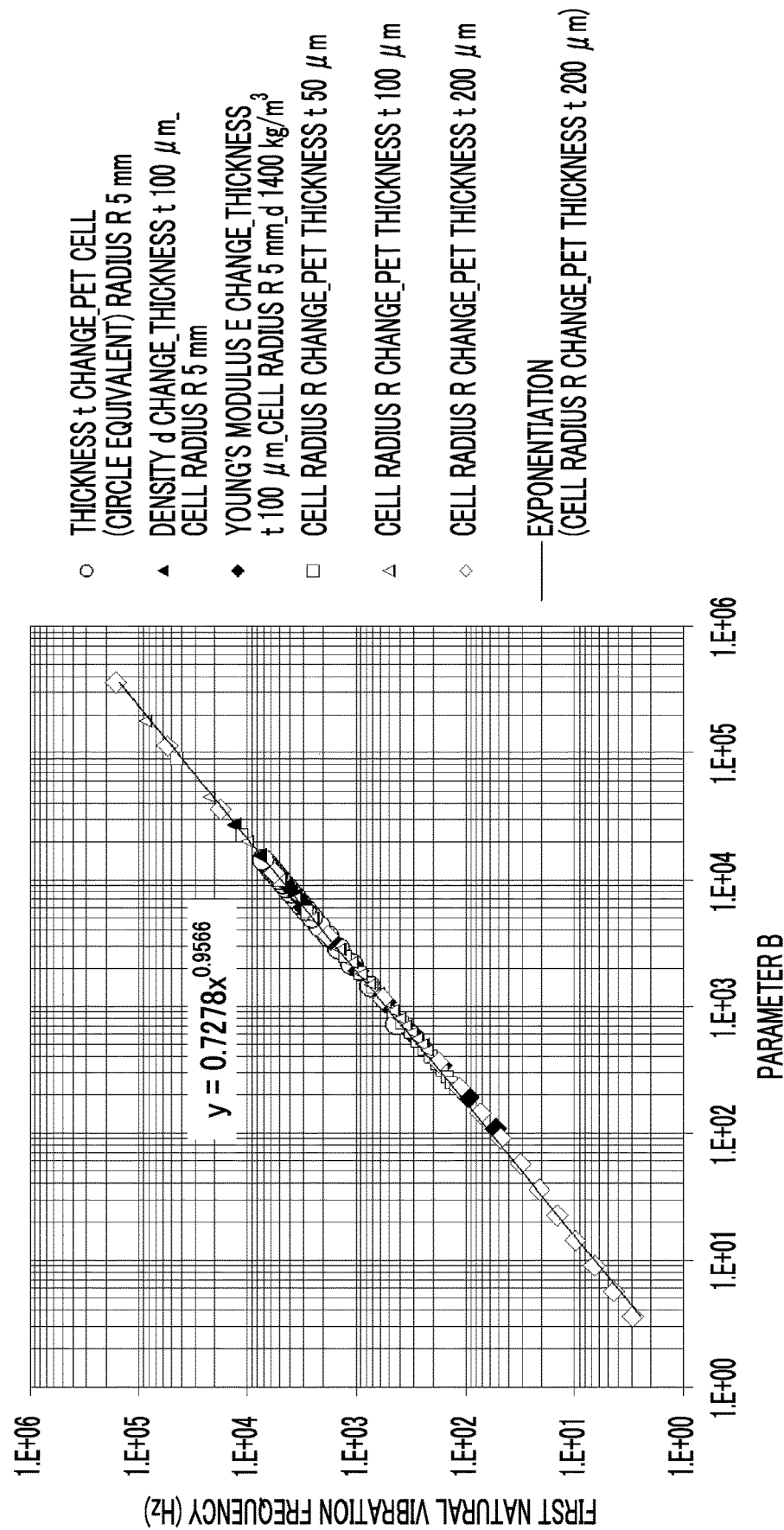
FIG. 26 is a graph showing a first natural vibration frequency with respect to a parameter B of the single layer soundproof structure used in the soundproof structure according to the present invention.

Incidentally, in the soundproof structure 10 of the present invention and the single layer soundproof structure 30, the present inventors have found that, assuming that the circle equivalent radius of the soundproof cell 26, that is, the frame 14 is R2 (m), the thickness of the film 18 is t2 (m), the Young's modulus of the film 18 is E2 (Pa), and the density of the film 18 is d (kg/m³), the parameter B (√m) expressed by the following Equation (2) and the first natural vibration frequency (Hz) of the structure configured to include the frame 14 and the film 18 of the soundproof structure 10 of the present invention, that is, the single layer soundproof structure 30 has a substantially linear relationship and are expressed by the following Equation (3) as shown in FIG. 26 even in a case where the circle equivalent radius R2 (m) of the soundproof cell 26, the thickness t2 (m) of the film 18, the Young's modulus E2 (Pa) of the film 18, and the density d (kg/m³) of the film 18 are changed.

$$B = t2/R2^{2} * \sqrt{(E2/d)} \quad (2)$$

$$y = 0.7278 x^{0.9566} \quad (3)$$

Here, y is the first natural vibration frequency (Hz), and x is the parameter B. y may be used as the first resonance frequency (Hz) of the laminated soundproof structure of the soundproof structure 10 of the present invention, but will be described as a representative of the first natural vibration frequency (Hz).

Incidentally, FIG. 26 is obtained from the simulation result at the design stage before the experiment of an example to be described later.

From the above, in the single layer soundproof structure 30, by standardizing the circle equivalent radius R2 (m) of the soundproof cell 26, the thickness t2 (m) of the film 18, the Young's modulus E2 (Pa) of the film 18, and the density d (kg/m³) of the film 18 with the parameter B (√m), a point representing the relationship between the parameter B and the first natural vibration frequency (Hz) of the single layer soundproof structure 30 on the two-dimensional (xy) coordinates is expressed by the above Equation (3) regarded as a substantially linear equation. Therefore, it can be seen that all points are on substantially the same straight line. In addition, both R2 and R1 represent the circle equivalent radius of the soundproof cell 26, but there is a relationship of $R2 = 10^{3} \times R1$. In addition, both t2 and t1 represent the thickness of the film 18, but there is a relationship of $t2 = 10^{6} \times t1$. In addition, both E2 and E1 represent the Young's modulus of the film 18, but there is a relationship of $E1 = 10^{9} \times E2$.

Table 1 shows the values of the parameter B corresponding to a plurality of values of the first natural vibration frequency from 10 Hz to 100000 Hz.

TABLE 1

| Frequency (Hz) | B parameter |
|---|---|
| 10 | $1.547 \times 10$ |
| 20 | $3.194 \times 10$ |
| 40 | $6.592 \times 10$ |
| 100 | $1.718 \times 10^{2}$ |
| 12000 | $2.562 \times 10^{4}$ |
| 16000 | $3.460 \times 10^{4}$ |
| 20000 | $4.369 \times 10^{4}$ |
| 100000 | $2.350 \times 10^{5}$ |

As is apparent from Table 1, the parameter B corresponds to the first natural vibration frequency. Therefore, in the present invention, the parameter B is preferably $1.547 \times 10$ (=15.47) to 2.350×10⁵ (23500), more preferably 3.194×10 (=31.94) to 4.369×10⁴ (43960), even more preferably 6.592×10 (=65.92) to 3.460×10⁴ (34600), and most preferably 1.718×10²(=171.8) to 2.562×10⁴ (25620).

By using the parameter B standardized as described above, it is possible to determine the lamination shielding peak frequency in the laminated soundproof structure of the soundproof structure 10 of the present invention or the single layer soundproof structure 30 or the first resonance frequency or the first natural vibration frequency that is an upper limit on the high frequency side of the shielding peak frequency, and it is possible to determine the lamination shielding peak frequency or the shielding peak frequency that is the center of the frequency band to be selectively insulated. Conversely, by using the parameter B, it is possible to set the single layer soundproof structure 30 having a first natural vibration frequency that can have a shielding peak frequency that is the center of the frequency band to be selectively insulated or the soundproof structure 10 of the present invention having a first resonance frequency that can have a lamination shielding peak frequency.

The present inventors have found that, in the laminated soundproof structure of the soundproof structure 10 of the present invention or the single layer soundproof structure 30, the first resonance frequency or the first natural vibration frequency is determined by the structure configured to include the frame 14 and the film 18, and the lamination shielding peak frequency or the shielding peak frequency at which the transmission loss reaches its peak is determined depending on the opening portion formed by the holes 22 drilled in the film of the structure configured to include the frame 14 and the film 18.

Figure 25:
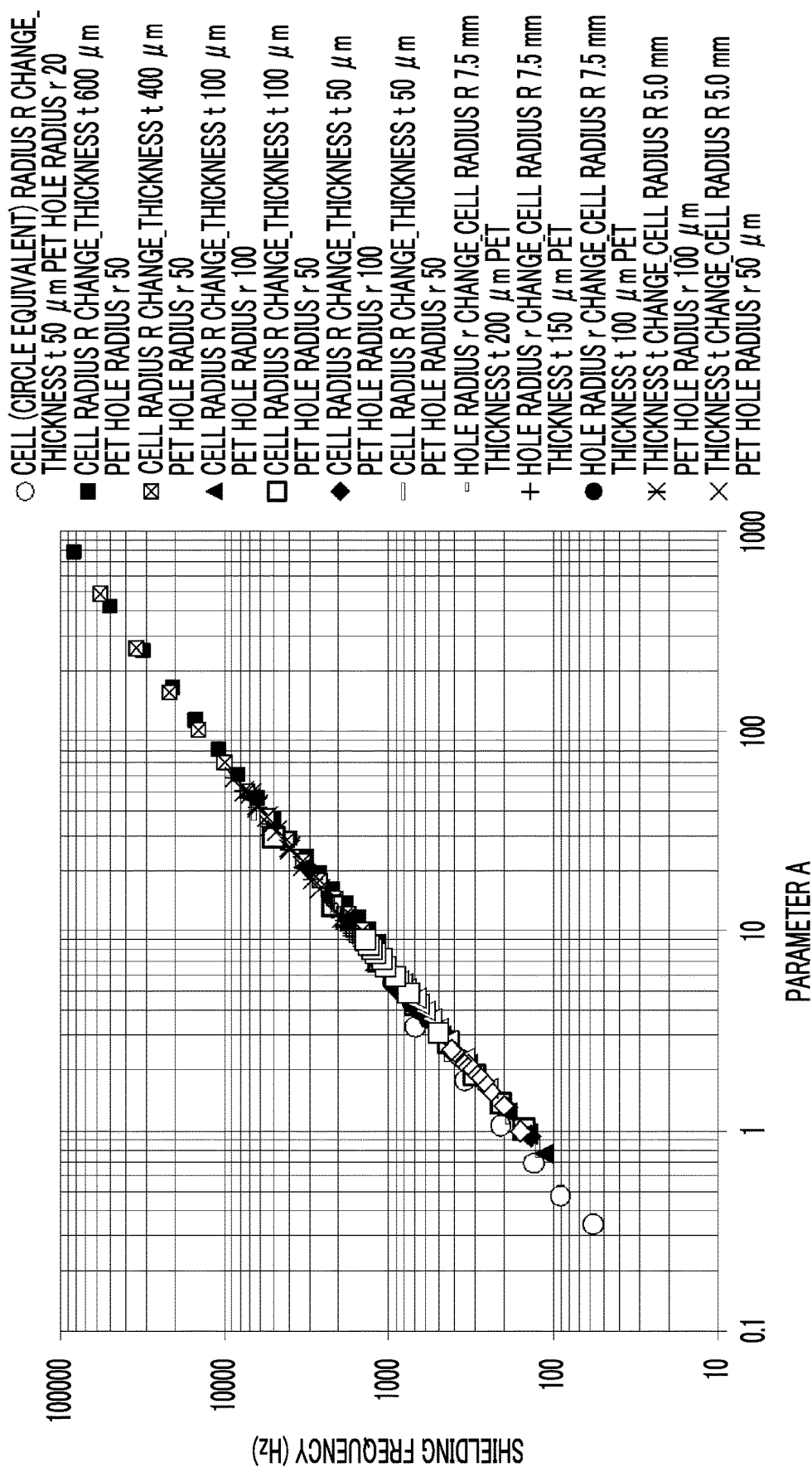
FIG. 25 is a graph showing a shielding frequency with respect to a parameter A of the single layer soundproof structure used in the soundproof structure according to the present invention.

Here, the present inventors have found that, in the laminated soundproof structure of the soundproof structure 10 of the present invention or the single layer soundproof structure 30, assuming that the circle equivalent radius of the soundproof cell 26, that is, the frame 14 is R1 (mm), the thickness of the film 18 is t1 (µm), the Young's modulus of the film 18 is E1 (GPa), and the circle equivalent radius of the opening portion 24 is r (µm), the parameter A expressed by the following Equation (1) and the lamination shielding peak frequency of the laminated soundproof structure of the soundproof structure 10 of the present invention or the shielding peak vibration frequency (Hz) of the single layer soundproof structure 30 have a substantially linear relationship, are expressed by a substantially linear equation, and are present on substantially the same straight line on the two-dimensional coordinates as shown in FIG. 25 even in a case where the circle equivalent radius R1 (mm) of the soundproof cell 26, the thickness t1 (µm) of the film 18, the Young's modulus E1 (GPa) of the film 18, and the circle equivalent radius r (µm) of the opening portion 24 are changed. It has also been found that the parameter A does not substantially depend on the density of the film or the Poisson's ratio.

$$A=\sqrt{(E1)}*(t1^{1.2})*(\ln(r)-e)/(R1^{2.8}) \quad (4)$$

Here, e is the number of Napier, and ln(x) is the logarithm of x with base e. Here, it is assumed that, in a case where a plurality of opening portions 24 are present in the soundproof cell 26, the circle equivalent radius r is calculated from the total area of a plurality of opening portions.

In addition, FIG. 25 is obtained from the simulation result at the design stage before the experiment of an example to be described later.

In the laminated soundproof structure of the soundproof structure 10 of the present invention or the single layer soundproof structure 30, assuming that the first resonance frequency or the first natural vibration frequency is 10 Hz to 100000 Hz, the lamination shielding peak vibration frequency is a frequency equal to or lower than the first resonance frequency, or the shielding peak vibration frequency is a frequency equal to or lower than the first natural vibration frequency. Accordingly, Table 2 shows the values of the parameter A corresponding to a plurality of values of the lamination shielding peak vibration frequency or the shielding peak vibration frequency from 10 Hz to 100000 Hz.

TABLE 2

| Frequency (Hz) | A parameter |
|---|---|
| 10 | 0.07000 |
| 20 | 0.1410 |
| 40 | 0.2820 |
| 100 | 0.7050 |
| 12000 | 91.09 |
| 16000 | 121.5 |
| 20000 | 151.8 |
| 100000 | 759.1 |

As is apparent from Table 1, the parameter A corresponds to the first resonance frequency or the first natural vibration frequency. Therefore, in the present invention, the parameter A is preferably 0.07000 to 759.1, more preferably 0.1410 to 151.82, even more preferably 0.2820 to 121.5, most preferably 0.7050 to 91.09.

By using the parameter A standardized as described above, the shielding peak frequency or the lamination shielding peak frequency can be determined in the soundproof structure of the present invention, and the sound in a predetermined frequency band centered on the lamination shielding peak frequency can be selectively insulated. Conversely, by using the parameter A, it is possible to set the soundproof structure of the present invention having the lamination shielding peak frequency that is the center of the frequency band to be selectively insulated.

In the soundproof structure of the present invention, it is important that both the through-hole 22, through which sound can pass as an acoustic wave rather than vibration, and the film 18 as a vibration film, through which sound passes, are present.

Therefore, even in a state in which the through-hole 22 through which sound can pass is covered with a member allowing sound to pass therethrough as an acoustic wave traveling through the air instead of film vibration of sound, it is possible to obtain a peak of sound insulation similarly to the case where the through-hole 22 is open. Such a member is a generally air-permeable member.

As a representative member having such air permeability, a mesh net can be mentioned. As an example, an Amidology 30 mesh product manufactured by NBC Meshtec Inc. can be mentioned. However, the present inventors have confirmed that even if the through-hole 22 is closed by this, the obtained spectrum does not change.

The net may have a lattice form or a triangular lattice form. In particular, since the net does not depend on its shape, there is no limitation on the net. The size of the entire net may be larger or smaller than the size of the frame body of the present invention. In addition, the size of the net may be a size covering the through-hole 22 of the film 18 in a one-to-one manner. In addition, the net may be a net whose mesh has a size intended for so-called insect repelling, or may be a net that prevents the entry of more fine sand. The material may be a net formed of a synthetic resin, or may be a wire for crime prevention or radio wave shielding.

In addition, the above-described permeable member is not limited to the mesh net. In addition to the net, a nonwoven fabric material, a urethane material, Synthrate (manufactured by 3M Company), Breath Air (manufactured by Toyobo Co., Ltd.), Dot Air (manufactured by Toray Industries, Inc.), and the like can be mentioned. In the present invention, by covering the through-hole 22 with such a material having air permeability, it is possible to prevent insects or sand from passing through the hole, to ensure the privacy such that the inside can be seen from a part of the through-hole 22, and to ensure hiding.

The soundproof structure of the present invention may be a window member, a screen door member, or a blind, a curtain, or a partition used as a foldable structure, or may be a cage member having a rectangular parallelepiped shape or a side wall provided on the side surface of the road or the railroad track. It is preferable that the soundproof structure of the present invention has a mechanism for changing the inter-film distance between the two single layer soundproof structures.

The soundproof structure of the present invention is basically configured as described above.

Since the soundproof structure of the present invention is configured as described above, the soundproof structure of the present invention has features that it is possible to perform low frequency shielding, which has been difficult in conventional soundproof structures, and that it is possible to design a structure capable of strongly insulating noise of various frequencies from low frequencies to frequencies exceeding 1000 Hz. In addition, since the soundproof structure of the present invention is based on the sound insulation principle independent of the mass of the structure (mass law), it is possible to realize a very light and thin sound insulation structure compared with conventional soundproof structures. Therefore, the soundproof structure of the present invention can also be applied to a soundproofing target from which it has been difficult to sufficiently insulate sound with the conventional soundproof structures.

For example, even in a single layer soundproof structure configured to include a frame, a film, and a hole (opening portion), it is possible to obtain a sufficient sound insulation performance with light weight. However, in order to further enhance the sound insulation performance (to increase the transmission loss to high dB), it is conceivable to increase the effective stiffness of the film portion, such as making the film thicker or making the frame smaller, or to reduce the opening ratio by making the hole smaller. However, particularly in a case where sound insulation on the low frequency side was examined, conditions for making the film thicker and making the frame smaller were difficult to use since the shielding peak is shifted to the high frequency side. In particular, in a case where ventilation or heat radiation was considered, it was also a problem to make the opening ratio smaller under the conditions of reducing the size of the hole.

For this reason, in particular, there has been a demand for a method for enhancing the sound insulation performance using a method in which the opening ratio reduction conditions of the hole (opening portion) at low frequency are not applied.

In the laminated soundproof structure of the present invention, since two layers are formed by laminating films without changing the size of the hole, it is possible to increase the size of the shielding peak while maintaining the size of the hole.

In the laminated soundproof structure of the present invention, since it is possible to finely adjust the shielding frequency by controlling the inter-film distance between the two single layer soundproof structures. Accordingly, there is an advantage that the frequency can be easily adjusted according to noise.

Compared with most conventional sound insulation materials such as the technique disclosed in U.S. Pat. No. 7,395,898B (corresponding Japanese Patent Application Publication: JP2005-250474A), the soundproof structure of the present invention has a feature that a weight for making the sound insulation structure heavy by shielding based on the mass law in the related art is not required, there is manufacturability simply by providing a hole in the film, and there is high robustness as a light sound insulation material. Similarly to the single layer soundproof structure, the soundproof structure of the present invention does not require a weight that causes an increase in the mass compared with the sound attenuation panel and the structure disclosed in U.S. Pat. No. 7,395,898B (corresponding Japanese Patent Application Publication: JP2005-250474A), it is possible to realize a lighter sound insulation structure.

In the soundproof structure of the present invention, it is possible to realize a strong sound insulation structure simply by drilling a hole in the film.

In the soundproof structure of the present invention, since a hole can be drilled in a film quickly and easily by laser processing or punch hole processing, there is manufacturability.

In the soundproof structure of the present invention, since the sound insulation characteristics hardly depend on the position or the shape of a hole, there is an advantage that stability is high in manufacturing.

In the soundproof structure of the present invention, since a hole is present, it is possible to realize a structure that shields, that is, reflects and/or absorbs sound while making a film have air permeability, that is, while allowing wind or heat to pass through the film.

In the soundproof structure of the present invention, since the single layer soundproof structure configured to include a frame, a film, and an opening portion (one or more holes) is laminated in two layers, the inter-film distance between the two layers can be used as a parameter. In addition, by changing the inter-film distance between the two layers, it is possible to easily change the width (band) of the shielding frequency. This is also a great advantage in adjusting the frequency.

Hereinafter, the physical properties or characteristics of a structural member that can be combined with a soundproof member having the soundproof structure of the present invention will be described.

Hereinafter, a single layer soundproof structure laminated to form the multilayered laminated soundproof structure of the present invention will be described.

[Flame Retardancy]

In the case of using a soundproof member having the soundproof structure of the present invention as a soundproof material in a building or a device, flame retardancy is required.

Therefore, the film is preferably flame retardant. As the film, for example, Lumirror (registered trademark) nonhalogen flame-retardant type ZV series (manufactured by Toray Industries, Inc.) that is a flame-retardant PET film, Teijin Tetoron (registered trademark) UF (manufactured by Teijin Ltd.), and/or Dialamy (registered trademark) (manufactured by Mitsubishi Plastics Co., Ltd.) that is a flame-retardant polyester film may be used.

The frame is also preferably a flame-retardant material. A metal such as aluminum, an inorganic material such as semilac, a glass material, flame-retardant polycarbonate (for example, PCMUPY 610 (manufactured by Takiron Co., Ltd.)), and/or flame-retardant plastics such as flame-retardant acrylic (for example, Acrylite (registered trademark) FR1 (manufactured by Mitsubishi Rayon Co., Ltd.)) can be mentioned.

As a method of fixing the film to the frame, a bonding method using a flame-retardant adhesive (Three Bond 1537 series (manufactured by Three Bond Co. Ltd.)) or solder or a mechanical fixing method, such as interposing a film between two frames so as to be fixed therebetween, is preferable.

[Heat Resistance]

There is a concern that the soundproofing characteristics may be changed due to the expansion and contraction of the structural member of the soundproof structure of the present invention due to an environmental temperature change. Therefore, the material forming the structural member is preferably a heat resistant material, particularly a material having low heat shrinkage.

As the film, for example, Teijin Tetoron (registered trademark) film SLA (manufactured by Teijin DuPont), PEN film Teonex (registered trademark) (manufactured by Teijin DuPont), and/or Lumirror (registered trademark) off-anneal low shrinkage type (manufactured by Toray Industries, Inc.) are preferably used. In general, it is preferable to use a metal film, such as aluminum having a smaller thermal expansion factor than a plastic material.

As the frame, it is preferable to use heat resistant plastics, such as polyimide resin (TECASINT 4111 (manufactured by Enzinger Japan Co., Ltd.)) and/or glass fiber reinforced resin (TECAPEEKGF 30 (manufactured by Enzinger Japan Co., Ltd.)) and/or to use a metal such as aluminum, an inorganic material such as ceramic, or a glass material.

As the adhesive, it is preferable to use a heat resistant adhesive (TB 3732 (Three Bond Co., Ltd.), super heat resistant one component shrinkable RTV silicone adhesive sealing material (manufactured by Momentive Performance Materials Japan Ltd.) and/or heat resistant inorganic adhesive Aron Ceramic (registered trademark) (manufactured by Toagosei Co., Ltd.)). In the case of applying these adhesives to a film or a frame, it is preferable to set the thickness to 1 µm or less so that the amount of expansion and contraction can be reduced.

[Weather Resistance and Light Resistance]

In a case where the soundproof member having the soundproof structure of the present invention is disposed outdoors or in a place where light is incident, the weather resistance of the structural member becomes a problem.

Therefore, as a film, it is preferable to use a weather-resistant film, such as a special polyolefin film (ARTPLY (registered trademark) (manufactured by Mitsubishi Plastics Inc.)), an acrylic resin film (ACRYPRENE (manufactured by Mitsubishi Rayon Co.)), and/or Scotch Calfilm (trademark) (manufactured by 3M Co.).

As a frame material, it is preferable to use plastics having high weather resistance such as polyvinyl chloride, polymethyl methacryl (acryl), metal such as aluminum, inorganic materials such as ceramics, and/or glass materials.

As an adhesive, it is preferable to use epoxy resin based adhesives and/or highly weather-resistant adhesives such as Dry Flex (manufactured by Repair Care International).

Regarding moisture resistance as well, it is preferable to appropriately select a film, a frame, and an adhesive having high moisture resistance. Regarding water absorption and chemical resistance, it is preferable to appropriately select an appropriate film, frame, and adhesive.

[Dust]

During long-term use, dust may adhere to the film surface to affect the soundproofing characteristics of the soundproof structure of the present invention. Therefore, it is preferable to prevent the adhesion of dust or to remove adhering dust.

As a method of preventing dust, it is preferable to use a film formed of a material to which dust is hard to adhere. For example, by using a conductive film (Flecria (registered trademark) (manufactured by TDK Corporation) and/or NCF (Nagaoka Sangyou Co., Ltd.)) so that the film is not charged, it is possible to prevent adhesion of dust due to charging. It is also possible to suppress the adhesion of dust by using a fluororesin film (Dynoch Film (trademark) (manufactured by 3M Co.)), and/or a hydrophilic film (Miraclain (manufactured by Lifegard Co.)), RIVEX (manufactured by Riken Technology Inc.) and/or SH2CLHF (manufactured by 3M Co.)). By using a photocatalytic film (Raceline (manufactured by Kimoto Corporation)), contamination of the film can also be prevented. A similar effect can also be obtained by applying a spray having the conductivity, hydrophilic property and/or photocatalytic property and/or a spray containing a fluorine compound to the film.

In addition to using the above special films, it is also possible to prevent contamination by providing a cover on the film. As the cover, it is possible to use a thin film material (Saran Wrap (registered trademark) or the like), a mesh having a mesh size not allowing dust to pass therethrough, a nonwoven fabric, a urethane, an airgel, a porous film, and the like.

Figure 27:
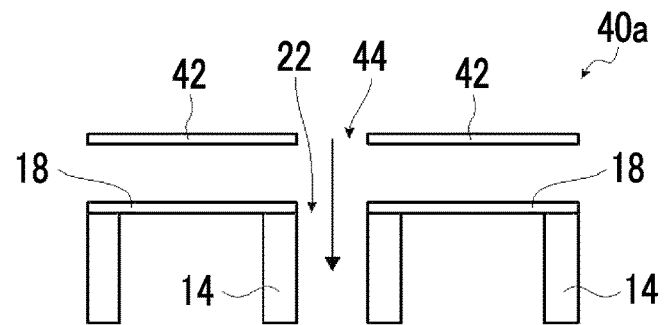
FIG. 27 is a schematic cross-sectional view of an example of a soundproof member having the soundproof structure of the present invention.
Figure 28:
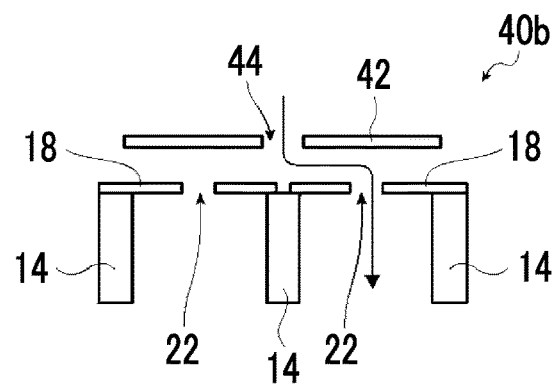
FIG. 28 is a schematic cross-sectional view of another example of the soundproof member having the soundproof structure of the present invention.

In the soundproof structure having a through-hole serving as a ventilation hole in the film, as in soundproof members 40a and 40b shown in FIGS. 27 and 28, it is preferable to perform arrangement by drilling the holes 44 in the cover 42 provided on the film 18 so that wind or dust is not in direct contact with the film 18.

As a method of removing adhering dust, it is possible to remove dust by emitting sound having the resonance frequency of a film and strongly vibrating the film. The same effect can be obtained even if a blower or wiping is used.

[Wind Pressure]

In a case where a strong wind hits a film, the film may be pressed to change the resonance frequency. Therefore, by covering the film with a nonwoven fabric, urethane, and/or a film, the influence of wind can be suppressed. In the soundproof structure having a through-hole in the film, similarly to the case of dust described above, as in the soundproof members 40a and 40b shown in FIGS. 27 and 28, it is preferable to perform arrangement by drilling the holes 44 in the cover 42 provided on the film 18 so that wind is not in direct contact with the film 18.

[Combination of Unit Cells]

The soundproof structure of the present invention is formed by one frame body 16 in which a plurality of frames 14 are continuous. However, the present invention is not limited thereto, and a soundproof cell as a unit cell having one frame and one film attached to the frame or as a unit cell having the one frame, the one film, and a through-hole formed in the film. That is, the soundproof member having the soundproof structure of the present invention does not necessarily need to be formed by one continuous frame body, and a soundproof cell having a frame structure as a unit cell and a film structure attached thereto or a soundproof cell having one frame structure, one film structure, and a hole structure formed in the film structure may be used. Such a unit cell can be used independently, or a plurality of unit cells can be connected and used.

As a method of connecting a plurality of unit cells, as will be described later, a Magic Tape (registered trademark), a magnet, a button, a suction cup, and/or an uneven portion may be attached to a frame body portion so as to be combined therewith, or a plurality of unit cells can be connected using a tape or the like.

[Arrangement]

Figure 29:
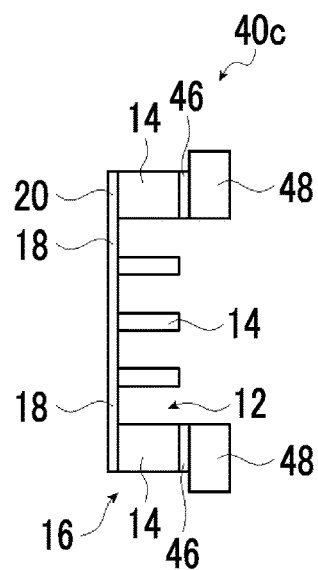
FIG. 29 is a schematic cross-sectional view showing an example of a state in which a soundproof member having the soundproof structure of the present invention is attached to the wall.
Figure 30:
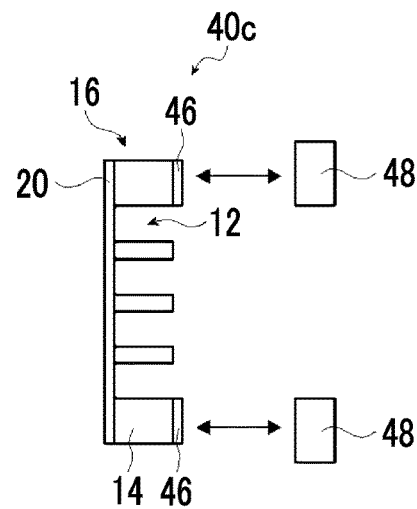
FIG. 30 is a schematic cross-sectional view of an example of a state in which the soundproof member shown in FIG. 29 is detached from the wall.

In order to allow the soundproof member having the soundproof structure of the present invention to be easily attached to a wall or the like or to be removable therefrom, a detaching mechanism formed of a magnetic material, a Magic Tape (registered trademark), a button, a suction cup, or the like is preferably attached to the soundproof member. For example, as shown in FIG. 29, a detaching mechanism 46 may be attached to the bottom surface of the frame 14 on the outer side of the frame body 16 of a soundproof member 40c, and the detaching mechanism 46 attached to the soundproof member 40c may be attached to a wall 48 so that the soundproof member 40c is attached to the wall 48. As shown in FIG. 30, the detaching mechanism 46 attached to the soundproof member 40c may be detached from the wall 48 so that the soundproof member 40c is detached from the wall 48.

Figure 31:
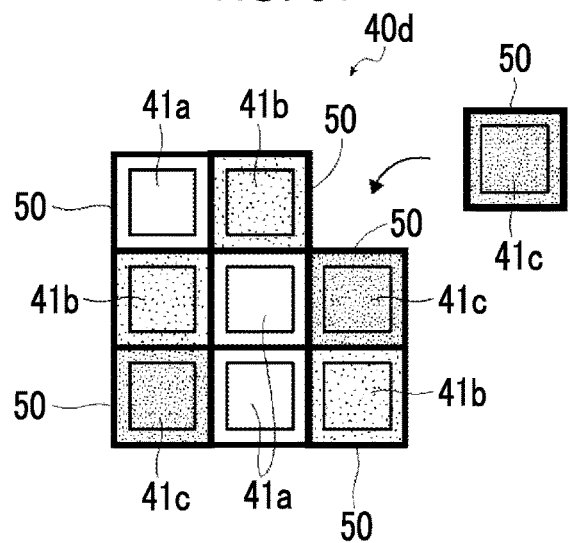
FIG. 31 is a plan view showing attachment and detachment of a unit cell in another example of the soundproof member having the soundproof structure according to the present invention.

In the case of adjusting the soundproofing characteristics of the soundproof member 40d by combining respective soundproof cells having different resonance frequencies, for example, by combining soundproof cells 41a, 41b, and 41c as shown in FIG. 31, it is preferable that the detaching mechanism 50, such as a magnetic material, a Magic Tape (registered trademark), a button, and a suction cup, is attached to each of the soundproof cells 41a, 41b, and 41c so that the soundproof cells 41a, 41b, and 41c are easily combined. In addition, an uneven portion may be provided in a soundproof cell.

Figure 32:
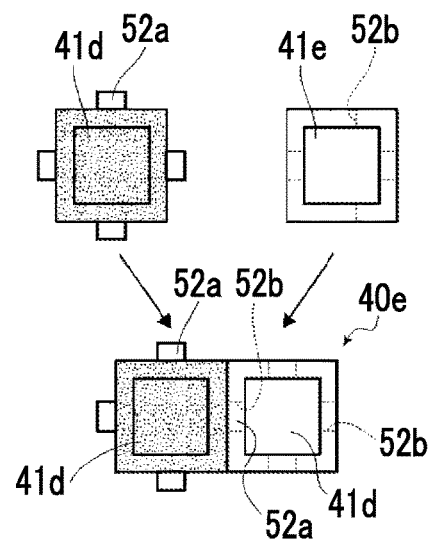
FIG. 32 is a plan view showing attachment and detachment of a unit cell in another example of the soundproof member having the soundproof structure according to the present invention.

For example, as shown in FIG. 32, a protruding portion 52a may be provided in a soundproof cell 41d and a recessed portion 52b may be provided in a soundproof cell 41e, and the protruding portion 52a and the recessed portion 52b may be engaged so that the soundproof cell 41d and the soundproof cell 41e are detached from each other. As long as it is possible to combine a plurality of soundproof cells, both a protruding portion and a recessed portion may be provided in one soundproof cell.

Furthermore, the soundproof cells may be detached from each other by combining the above-described detaching mechanism 50 shown in FIG. 31 and the uneven portion, the protruding portion 52a, and the recessed portion 52b shown in FIG. 32.

[Mechanical Strength of Frame]

As the size of the soundproof member having the soundproof structure of the present invention increases, the frame easily vibrates, and a function as a fixed end with respect to film vibration is degraded. Therefore, it is preferable to increase the frame stiffness by increasing the thickness of the frame. However, increasing the thickness of the frame causes an increase in the mass of the soundproof member. This declines the advantage of the present soundproof member that is lightweight.

Figure 33:
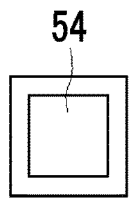
FIG. 33 is a plan view of an example of a soundproof cell of the soundproof structure of the present invention.
Figure 34:
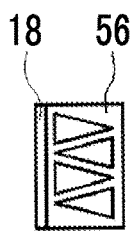
FIG. 34 is a side view of the soundproof cell shown in FIG. 33.
Figure 35:
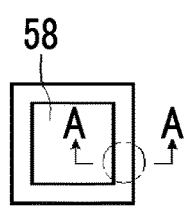
FIG. 35 is a plan view of an example of a soundproof cell of the soundproof structure of the present invention.
Figure 36:
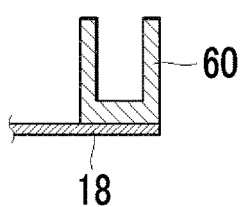
FIG. 36 is a schematic cross-sectional view of the soundproof cell shown in FIG. 35 as viewed from the arrow A-A.

Therefore, in order to reduce the increase in mass while maintaining high stiffness, it is preferable to form a hole or a groove in the frame. For example, by using a truss structure as shown in a side view of FIG. 34 for a frame 56 of a soundproof cell 54 shown in FIG. 33 or by using a Rahmem structure as shown in the A-A arrow view of FIG. 36 for a frame 60 of a soundproof cell 58 shown in FIG. 35, it is possible to achieve both high stiffness and light weight.

Figure 37:
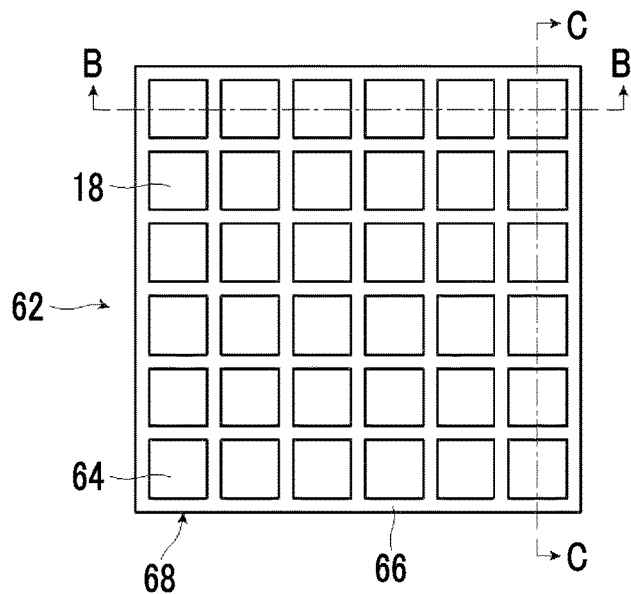
FIG. 37 is a plan view of another example of the soundproof member having the soundproof structure of the present invention.
Figure 38:
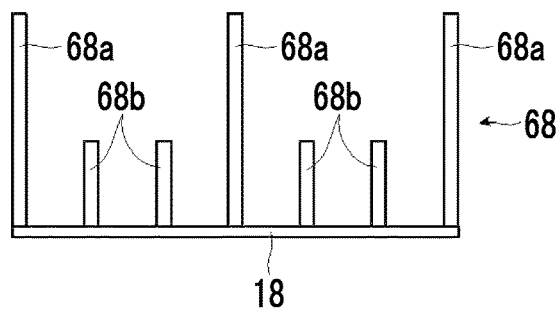
FIG. 38 is a schematic cross-sectional view of the soundproof member shown in FIG. 37 as viewed from the arrow B-B.
Figure 39:
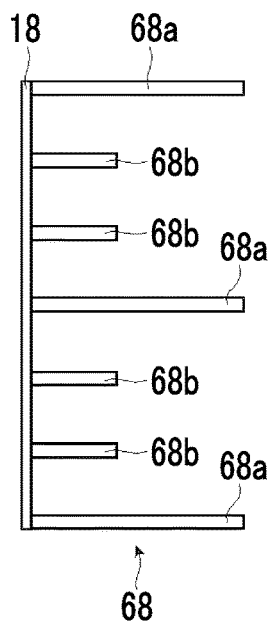
FIG. 39 is a schematic cross-sectional view of the soundproof member shown in FIG. 37 as viewed from the arrow C-C.

For example, as shown in FIGS. 37 to 39, by changing or combining the frame thickness in the plane, it is possible to secure high stiffness and to reduce the weight. As in a soundproof member 62 having the soundproof structure of the present invention shown in FIG. 37, as shown in FIG. 38 that is a schematic cross-sectional view of the soundproof member 62 shown in FIG. 37 taken along the line B-B, plate-shaped members 68a on both outer sides and a central plate-shaped member 68a of a frame body 68 configured to include a plurality of frames 66 of 36 soundproof cells 64 are made thicker than plate-shaped members 68b of the other portions. In the illustrated example, the plate-shaped members 68a on both outer sides and the central plate-shaped member 68a are made two times or more thicker than the plate-shaped members 68b of the other portions. As shown in FIG. 39 that is a schematic cross-sectional view taken along the line C-C perpendicular to the line B-B, similarly in the direction perpendicular to the line B-B, the plate-shaped members 68a on both outer sides and the central plate-shaped member 68a of the frame body 68 are made thicker than the plate-shaped members 68b of the other portions. In the illustrated example, the plate-shaped members 68a on both outer sides and the central plate-shaped member 68a are made two times or more thicker than the plate-shaped members 68b of the other portions.

In this manner, it is possible to achieve both high stiffness and light weight.

For the sake of simplicity, a through-hole is not shown in the film 18 of each of the soundproof cells shown in FIGS. 29 to 39 described above. However, it is needless to say that a through-hole is drilled.

The soundproof structure of the present invention can be used as the following soundproof members.

For example, as soundproof members having the soundproof structure of the present invention, it is possible to mention: a soundproof member for building materials (soundproof member used as building materials); a soundproof member for air conditioning equipment (soundproof member installed in ventilation openings, air conditioning ducts, and the like to prevent external noise); a soundproof member for external opening portion (soundproof member installed in the window of a room to prevent noise from indoor or outdoor); a soundproof member for ceiling (soundproof member installed on the ceiling of a room to control the sound in the room); a soundproofing member for floor (soundproof member installed on the floor to control the sound in the room); a soundproof member for internal opening portion (soundproof member installed in a portion of the inside door or sliding door to prevent noise from each room); a soundproof member for toilet (soundproof member installed in a toilet or a door (indoor and outdoor) portion to prevent noise from the toilet); a soundproof member for balcony (soundproof member installed on the balcony to prevent noise from the balcony or the adjacent balcony); an indoor sound adjusting member (soundproof member for controlling the sound of the room); a simple soundproof chamber member (soundproof member that can be easily assembled and can be easily moved); a soundproof chamber member for pet (soundproof member that surrounds a pet's room to prevent noise); amusement facilities (soundproof member installed in a game centers, a sports center, a concert hall, and a movie theater); a soundproof member for temporary enclosure for construction site (soundproof member for covering construction site and preventing leakage of a lot of noise around the site); and a soundproof member for tunnel (soundproof member installed in a tunnel to prevent noise leaking to the inside and outside the tunnel).

The soundproof structure of the present invention is manufactured as follows.

First, two sets of the frame body 16 having a plurality of frames 14 and the sheet-shaped film body 20 covering all the through-holes 12 of all the frames 14 of the frame body 16 are prepared.

Then, the sheet-shaped film body 20 is fixed to all the frames 14 of the frame body 16 of each set with an adhesive to form the film 18 that covers the through-holes 12 of all the frames 14, thereby forming two sets of a plurality of soundproof cells having a structure configured to include the frame 14 and the film 18.

Then, one or more holes 22 are drilled in the film 18 of each of the two sets of a plurality of soundproof cells using a processing method for absorbing energy, such as laser processing, or a mechanical processing method based on physical contact, such as punching or needle processing, thereby forming the opening portion 24 in each soundproof cell 26.

In this manner, the single layer soundproof structure 30 (30a, 30b) is manufactured.

The single layer soundproof structures 30a and 30b manufactured in this manner are laminated and fixed.

The film 18 of the single layer soundproof structure 30a and the frame 14 of the single layer soundproof structure 30b may be directly fixed with an adhesive and the frame 14 of the single layer soundproof structure 30a and the film 18 of the single layer soundproof structure 30b may be directly fixed with an adhesive, or the film 18 of the single layer soundproof structure 30a and the frame 14 of the single layer soundproof structure 30b may be fixed with an adhesive with the frame 14 of the spacer 32 interposed therebetween and the frame 14 of the single layer soundproof structure 30a and the film 18 of the single layer soundproof structure 30b may be fixed with an adhesive with the frame 14 of the spacer 32 interposed therebetween.

In this manner, it is possible to manufacture the soundproof structure 10 of the present invention in which the single layer soundproof structures 30a and 30b are laminated.

In the case of a frame structure in which the frame body 16 of the single layer soundproof structures 30a and 30b and the frame body 16 of the spacer 32 are continuous, the film 18 may be fixed to the frame 14 with an adhesive after manufacturing the frame structure first.

The soundproof structure manufacturing method of the present invention is basically configured as described above.

EXAMPLES

The soundproof structure of the present invention will be specifically described by way of examples.

Before performing an experiment to manufacture an example of the present invention and measure the acoustic characteristic, the design of the soundproof structure is shown.

Since the system of the soundproof structure is an interaction system of film vibration and sound waves in air, analysis was performed using coupled analysis of sound and vibration. Specifically, designing was performed using an acoustic module of COMSOL ver 5.0 that is analysis software of the finite element method. First, a first natural vibration frequency was calculated by natural vibration analysis. Then, by performing acoustic structure coupled analysis based on frequency sweep in the periodic structure boundary, transmission loss at each frequency with respect to the sound wave incident from the front was calculated.

Based on this design, the shape or the material of the sample was determined. The shielding peak frequency in the experimental result satisfactorily matched the prediction from the simulation.

The correspondence between the first resonance frequency and each physical property was found by taking advantage of the characteristics of the simulation in which the material characteristics or the film thickness can be freely changed. As the parameter B, natural vibration was calculated by changing the thickness t2 (m) of the film 18, the size (or radius) R2 (m) of the frame 14, the Young's modulus E2 (Pa) of the film, and the density d (kg/m³) of the film. The result is shown in FIG. 26. The present inventors have found that a first natural vibration frequency f_resonance is substantially proportional to $t2/R2^2 * \sqrt{(E2/d)}$ through this calculation. Accordingly, it was found that natural vibration could be predicted by setting the parameter $B = t2/R2^2 * \sqrt{(E2/d)}$.

Example 1, Comparative Example 1

A soundproof structure of Example 1 having a two-layer laminated structure in which a PET film having a thickness of 188 μm as the film 18 was bonded to the frame 14 having a size of 25 mm square and then the hole 22 having a diameter of 1 mm was formed was manufactured as follows. The manufacturing method is shown.

A PET film (Lumirror manufactured by Toray Industries, Inc.) 188 μm product was used as the film 18. An acrylic plate having a thickness of 3 mm was used as the frame 14, and the shape of the frame 14 was a square. Processing was performed with one side of the square through-hole 12 as 25 mm.

The width of the frame 14 was 2 mm. There are a total of four through-holes 12 of the frame structure (frame 14 of the frame body 16). For the frame structure, the PET film was fixed to 2×2 regions of the frame 14 with a double-sided tape manufactured by Nitto Denko Co. Thereafter, the through-hole 22 having a diameter of 1 mm was formed in each PET film by punching for each soundproof cell 26. At this time, adjustment was made so as to form the through-hole 22 in a central portion of the film 18.

By repeating this procedure twice, two single layer soundproof structures 30 (30a, 30b) configured to include the frame 14, the film 18, and the hole 22 of the same conditions was able to be obtained.

The single layer soundproof structure 30 obtained in this manner is Comparative Example 1.

First, the characteristics of the single layer soundproof structure 30 (30a, 30b) as Comparative Example 1 were evaluated. Hereinafter, a method of measuring the acoustic characteristics is shown.

The acoustic characteristics were measured by a transfer function method using four microphones in a self-made aluminum acoustic tube. This method is based on "ASTM E2611-09: Standard Test Method for Measurement of Normal Incidence Sound Transmission of Acoustical Materials Based on the Transfer Matrix Method". As the acoustic tube, for example, an acoustic tube based on the same measurement principle as WinZac manufactured by Nitto Bosei Aktien Engineering Co., Ltd. was used. It is possible to measure the sound transmission loss in a wide spectral band using this method. The soundproof structure was disposed in a measurement portion of the acoustic tube, and the sound transmission loss was measured in the range of 100 Hz to 2000 Hz.

The measurement result of the transmission loss of the single layer soundproof structure 30 of Comparative Example 1 is shown in FIG. 11A.

At a shielding peak frequency of 664 Hz, its transmission loss was 28 dB. The result is shown in Table 3.

Figure 11B:
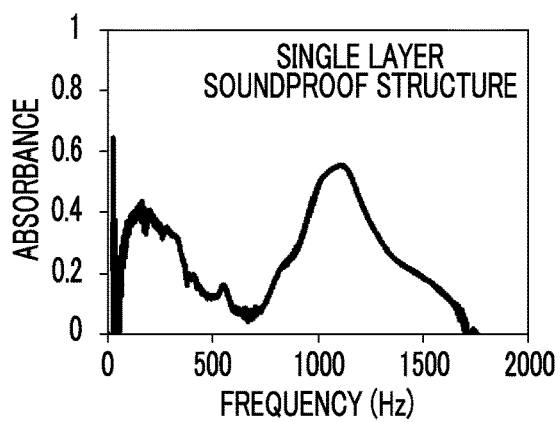
FIG. 11B is a graph showing the sound absorption characteristics expressed by the absorbance of the single layer soundproof structure, which is used in the soundproof structure according to the present invention, with respect to the frequency.

The frequency dependency of the absorbance was calculated using the measured transmittance and reflectivity. The result is shown in FIG. 11B.

Next, as shown in FIG. 5, a soundproof structure of Example 1 of the present invention that was a two-layer laminated soundproof structure with a distance (inter-film distance) between the films 18 as 3 mm was manufactured by interposing a single layer frame structure (which was formed of acryl, had a thickness of 3 mm and a width of 2 mm, and had a through-hole 12 of 25 mm) serving as the spacer 32 between the two single layer soundproof structures 30a and 30b. The transmission loss of the two-layer structure was measured. The result is shown in FIG. 12A, and the absorbance measurement result is shown in FIG. 12B in the same manner.

Figure 12A:
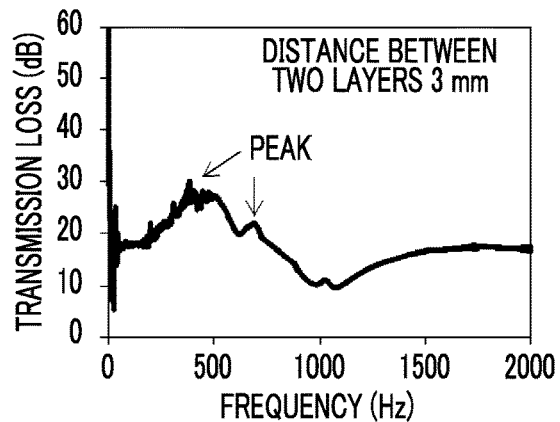
FIG. 12A is a graph showing the sound insulation characteristics of a soundproof structure of Example 1 of the present invention.
Figure 12B:
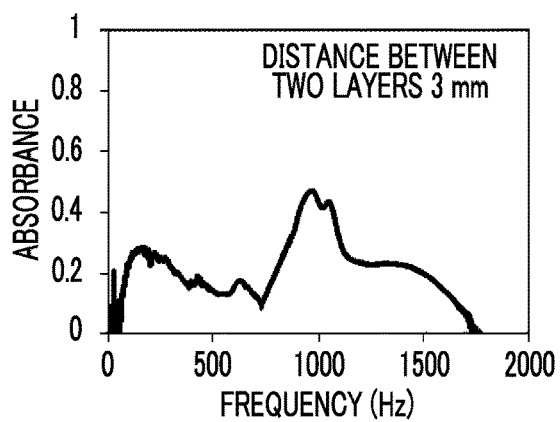
FIG. 12B is a graph showing the sound absorption characteristics of a soundproof structure of Example 1 of the present invention.

As shown in FIG. 12A, the shielding peak (lamination shielding peak frequency-transmission loss) shifts to the low frequency side, and there is a broad peak on the low frequency side from 388 Hz-30 dB to 514 Hz-27 dB. At the same time, another peak of 22 dB appeared at 700 Hz to form double peaks. That is, it could be seen that the peak was widened and divided into double peaks by laminating completely the same single layer soundproof structures 30 in two layers. It can be seen that this characteristic is a useful characteristic for adjusting the shielding peak or widening the shielding. The result is shown in Table 3.

Hereinafter, since the measurement methods are the same in all examples and comparative examples, manufacturing methods as samples are shown.

Example 2

Figure 13B:
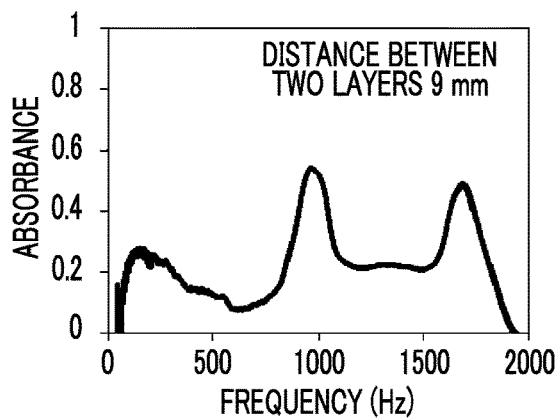
FIG. 13B is a graph showing the sound absorption characteristics of a soundproof structure of Example 2 of the present invention.

Instead of using the spacer 32 (acrylic frame body 16) of one layer interposed between the two single layer soundproof structures 30a and 30b in Example 1, the spacer 32 (acrylic frame body 16) of three layers interposed between the two single layer soundproof structures 30a and 30b was used, and the inter-film distance between layers of the single layer soundproof structures 30a and 30b was set to 9 mm, thereby forming a laminated soundproof structure. The measurement results of the transmission loss and the absorbance of the laminated soundproof structure are shown in FIGS. 13A and 13B. The maximum value of the transmission loss was one, and was 41 dB at 517 Hz (lamination shielding peak frequency). Accordingly, the transmission loss was larger than that of the single layer soundproof structure 30. The result is shown in Table 3.

The minimum value of the transmission loss due to the first natural vibration frequency of the two single layer soundproof structures 30a and 30b was divided into two by the interaction between films of two layers of the laminated soundproof structure. At both frequencies, the sound absorbance was increased by vibration. Therefore, although the same single layer soundproof structures 30 overlap each other, it was possible to increase the width of absorption.

Example 3

Figure 14B:
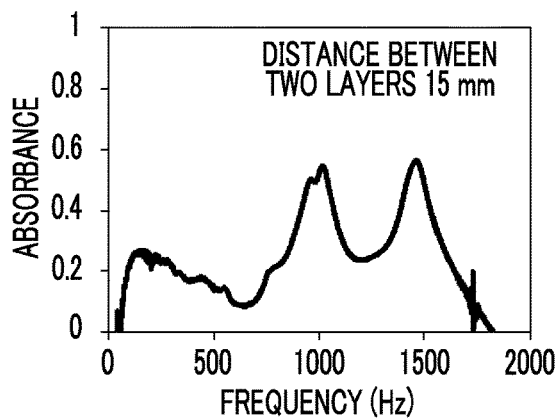
FIG. 14B is a graph showing the sound absorption characteristics of a soundproof structure of Example 3 of the present invention.

Instead of using the spacer 32 (acrylic frame body 16) of one layer interposed between the two single layer soundproof structures 30a and 30b in Example 1, the spacer 32 (acrylic frame body 16) of five layers interposed between the two single layer soundproof structures 30a and 30b was used, and the inter-film distance between layers of the single layer soundproof structures 30a and 30b was set to 15 mm, thereby forming a laminated soundproof structure. The measurement results of the transmission loss and the absorbance of the laminated soundproof structure are shown in FIGS. 14A and 14B. The maximum value of the transmission loss was 51 dB at 512 Hz. Accordingly, compared with the laminated soundproof structure of Example 2, the peak of transmission loss was further increased. The result is shown in Table 3.

As in Example 2, the minimum value of the transmission loss due to the first natural vibration frequency of the two single layer soundproof structures 30a and 30b was divided into two by the interaction between films of two layers of the laminated soundproof structure. As in Example 2, the maximum value of the absorbance is also divided into two, and the frequency of the maximum value of the absorbance corresponds to the minimum value of the transmission loss. There was a characteristic that the frequency difference between the minimum values of the transmission loss was smaller than that of Example 2 and the transmission loss minimum value on the high frequency side shifted to the low frequency side without a change on the low frequency side.

TABLE 3

|  | Frame size | Film thickness | Hole size | Distance between two layers | Transmission loss frequency | Transmission loss (dB) |
| --- | --- | --- | --- | --- | --- | --- |
| Example 1 | 25 | 188 | 1 | 3 | 388 | 30 |
| Example 2 | 25 | 188 | 1 | 9 | 517 | 41 |
| Example 3 | 25 | 188 | 1 | 15 | 512 | 51 |
| Comparative Example 1 | 25 | 188 | 1 | Only one layer | 664 | 28 |

Examples 4 to 6

Instead of bonding a PET film having a thickness of 188 μm as the film 18 to an acrylic square frame having a frame size of 25 mm as the frame 14 in Example 1, a PET film having a thickness of 100 μm as the film 18 was bonded to an acrylic square frame having a frame size of 15 mm as the frame 14 and then the hole 22 was formed, thereby manufacturing a two-layer laminated soundproof structure.

Incidentally, the region of the through-hole 12 of the frame 14 was not 4×4 but 2×2, and the PET film was fixed to the frame portion of the frame 14 using a double-sided tape. The hole 22 having a diameter of 1 mm was formed in a central portion of the film 18 of a unit cell, which is configured to include the frame 14 and the film 18, by punching. By repeating this step twice, two single layer soundproof structures 30 (30a and 30b) of the same conditions was able to be obtained.

Next, soundproof structures of Examples 4 to 8 of the present invention, each of which was a two-layer laminated soundproof structure in which the inter-film distance between two layers was changed by interposing the spacer 32 between the two single layer soundproof structures 30a and 30b, were manufactured.

In Examples 4 to 8, the inter-film distance was changed to 1 mm, 5 mm, 10 mm, 20 mm, and 30 mm. The transmission loss and the absorbance of Examples 4 to 8 at this time are shown in FIGS. 15A and 15B, respectively. These results are shown in Table 4.

It is the same as in Examples 1 to 3 that the maximum value of the transmission loss increases as the inter-film distance increases. There is a frequency, which changes so that the inclination of the transmission loss decreases, on the lower frequency side than the maximum value of the transmission loss, and the absorbance is the maximum at the frequency. It can be seen that the frequency shifts to the lower frequency side as the inter-film distance becomes larger and this is a characteristic advantageous for low frequency sound absorption.

Example 10

Subsequently, a structure was manufactured in which a hole was further formed in a PET film of 188 μm as the film 18 between two acrylic frame bodies 16 used as the spacer 32 of Example 9. Specifically, a PET film of 188 μm as the film 18 was fixed to the frame portion of the spacer 32 (acrylic frame body 16) with a double-sided tape, and the hole 22 having a diameter of 1 mm was formed in the central portion by punching. In this manner, a three-layer laminated soundproof structure was manufactured in which a structure, in which a PET film of 188 μm as the film 18 was fixed to the 20 mm square frame 14 and the hole 22 having a diameter of 1 mm was formed in the central portion, was laminated in three layers. Since the distance between the films 18, that is, the inter-film distance between two layers was 3 mm, the total thickness was 6 mm. Therefore, the total thickness was the same as in Example 9.

Figure 16A:
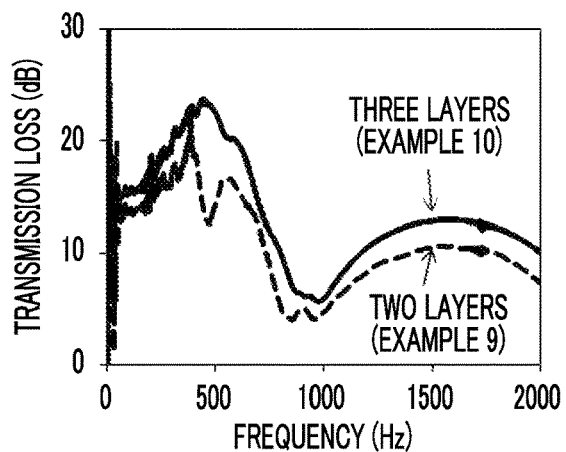
FIG. 16A is a graph showing the sound insulation characteristics of soundproof structures of Examples 9 and 10 of the present invention.
Figure 16B:
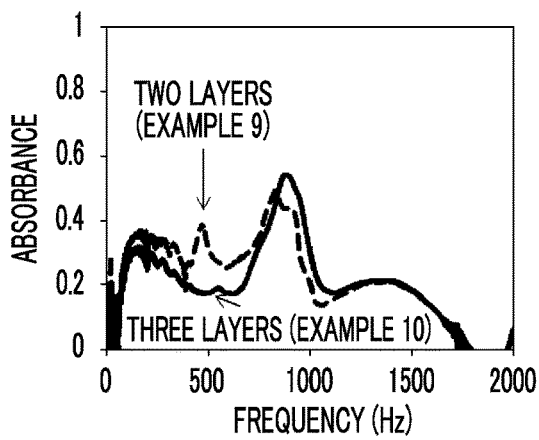
FIG. 16B is a graph showing the sound absorption characteristics of the soundproof structures of Examples 9 and 10 of the present invention.
Figure 17A:
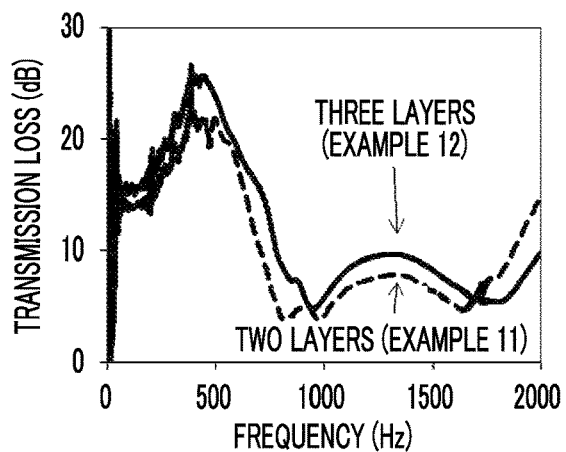
FIG. 17A is a graph showing the sound insulation characteristics of soundproof structures of Examples 11 and 12 of the present invention.
Figure 17B:
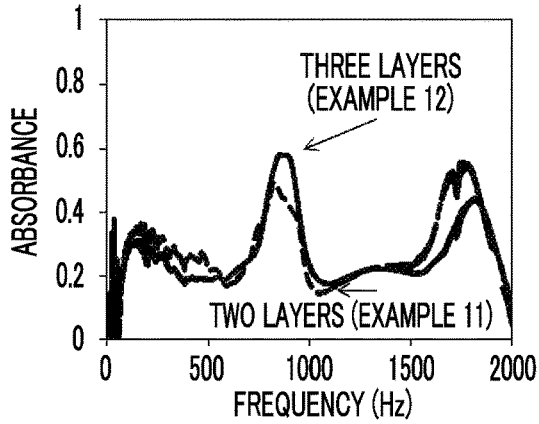
FIG. 17B is a graph showing the sound absorption characteristics of the soundproof structures of Examples 11 to 12 of the present invention.

The transmission loss of the three-layer laminated soundproof structure is shown by a solid line in FIG. 16A. Similarly, the measurement result of the absorbance is shown by a solid line in FIG. 16B.

By configuring the laminated soundproof structure as a three-layer structure, the maximum value of the transmission loss that has been double peaked in the two-layer laminated soundproof structure was a single peak, and the

TABLE 4

| | Frame size | Film thickness | Hole size | Distance between two layers | Transmission loss frequency | Transmission loss (dB) | Absorption maximum frequency | Absorbance |
|---|---|---|---|---|---|---|---|---|
| Example 4 | 15 | 100 | 1 | 1 | 1090 | 23 | | |
| Example 5 | 15 | 100 | 1 | 5 | 1082 | 27 | 994 | 0.37 |
| Example 6 | 15 | 100 | 1 | 10 | 1094 | 32 | 829 | 0.46 |
| Example 7 | 15 | 100 | 1 | 20 | 1039 | 44 | 669 | 0.56 |
| Example 8 | 15 | 100 | 1 | 30 | 1034 | 50 | 575 | 0.64 |

Example 9

In order to compare a three-layer laminated soundproof structure with a two-layer laminated soundproof structure, the two-layer laminated soundproof structure was first manufactured. As in Example 1, a PET film of 188 μm as the film 18 was bonded to the frame 14 having a square frame size of 20 mm and then the hole 22 was formed, thereby manufacturing the laminated soundproof structure of the two-layer film structure. The region of the through-hole 12 of the frame 14 was 3×3, and the PET film was fixed to the frame portion of the frame 14 using a double-sided tape. The hole 22 having a diameter of 1 mm was formed in a central portion of the film 18 of a unit cell, which is configured to include the frame 14 and the film 18, by punching. By repeating this step twice, two single layer soundproof structures 30 (30a, 30b) of the same conditions was able to be obtained.

For the inter-film distance between the two single layer soundproof structures 30a and 30b, as in Example 1, the inter-film distance between two layers was set to 6 mm by interposing two spacers 32 (acrylic frame bodies 16) having a thickness of 3 mm. The transmission loss of the two-layer laminated soundproof structure was measured. The result is shown by a dotted line in FIG. 16A. Similarly, the measurement result of the absorbance is shown by a dotted line in FIG. 16B. For the transmission loss shown in FIG. 16A, it can be seen that the maximum value is double peaked due to the small inter-film distance.

transmission loss increased as a whole. In addition, absorption in the vicinity of 1000 Hz that was the first resonance frequency was also increased by adopting the three-layer structure.

Example 11

Using the same manufacturing method as in Example 9, a structure was manufactured in which the acrylic frame body 16 of four layers having a thickness of 3 mm, which served as the spacer 32, was interposed in order to set the inter-film distance between two layers to 12 mm instead of setting the inter-film distance between two layers to 6 mm. The transmission loss is shown by a dotted line in FIG. 17A. Similarly, the absorbance is shown by a dotted line in FIG. 17B.

Example 12

One PET film of 188 μm as the film 18 was fixed to the center of an acrylic frame body serving as the spacer 32 of Example 11, and the hole 22 of 1 mm was formed at the center of the film 18. That is, a laminated soundproof structure was manufactured which had the same structure as in Example 10 and the distance between the films 18 (PET films) was set to 6 mm instead of 3 mm. The total thickness is 12 mm as in Example 11. The transmission loss is shown by a solid line in FIG. 17A. Similarly, the absorbance is shown by a solid line in FIG. 17B.

By adopting the three-layer laminated soundproof structure, the peak of the maximum value of the transmission loss increased, and the maximum value of the absorbance at the first resonance frequency increased.

In this manner, by adopting the multilayer structure, it was possible to make the transmission loss larger than that of the two-layer structure while keeping the total thickness of the laminated soundproof structure similarly.

(Simulation)

Figure 18:
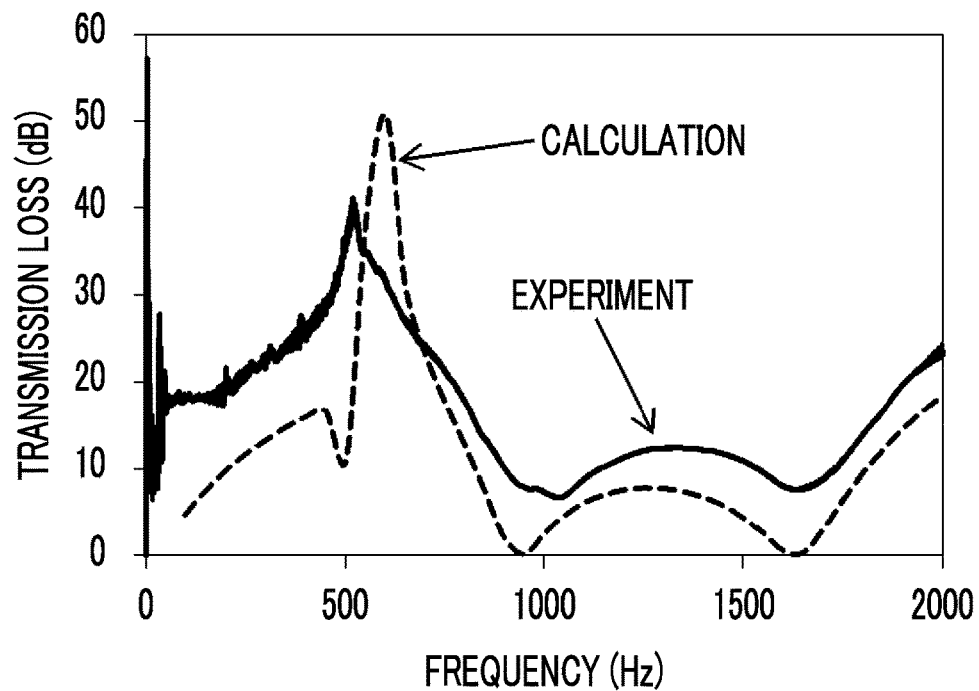
FIG. 18 is a graph showing the measured values of the sound insulation characteristics of the soundproof structure of Example 2 of the present invention and the simulation results of the sound insulation characteristics of the soundproof structure corresponding thereto.

FIG. 18 shows the transmission loss measurement result (solid line) of Example 2 and the transmission loss simulation result (dotted line) of COMSOL calculation result in a case where the inter-film distance of 9 mm is set in the laminated soundproof structure configured to include the hole 22 and the film 18 fixedly constrained to the frame 14 having a side of 25 mm so as to correspond to Example 2.

Figure 19:
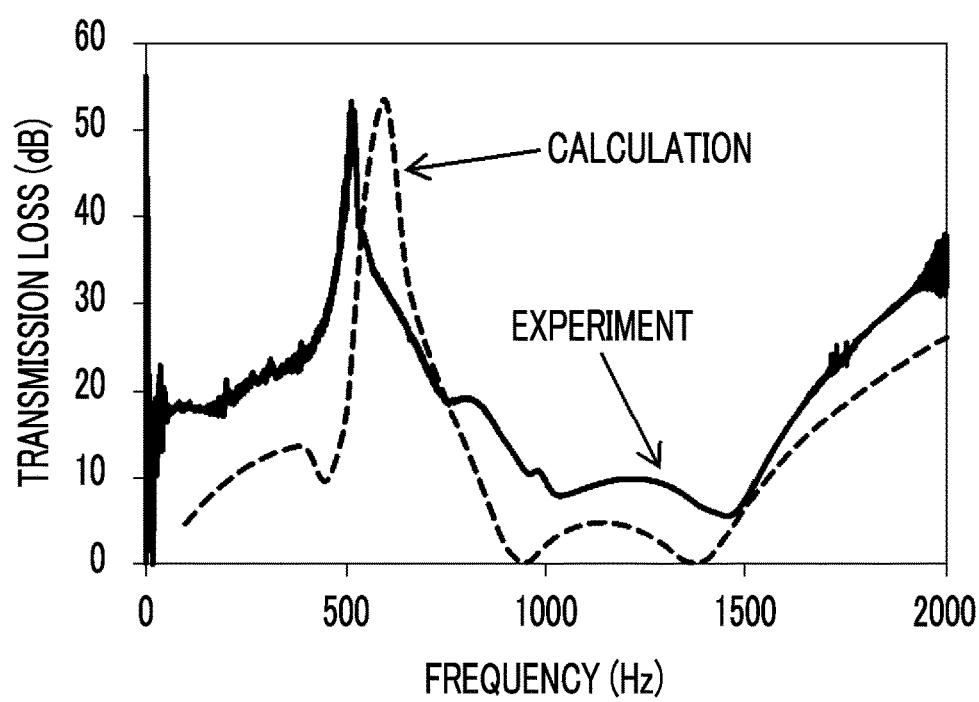
FIG. 19 is a graph showing the measured values of the sound insulation characteristics of the soundproof structure of Example 3 of the present invention and the simulation results of the sound insulation characteristics of the soundproof structure corresponding thereto.

From FIG. 18, the transmission loss measurement result and the transmission loss simulation result satisfactorily match each other on the whole, for example, in the division size of the first resonance frequency due to interaction. Similarly, FIG. 19 shows a comparison between the transmission loss according to the experiment of Example 3 and the transmission loss by simulation. Also in FIG. 19, similarly to FIG. 18, it can be seen that the transmission loss according to the experiment of Example 3 and the transmission loss by simulation satisfactorily match each other.

Therefore, analysis using simulation was performed considering the fact that parameters can be freely changed according to the relationship between the distance between the films 18 (inter-film distance) and the interaction.

In the calculation of COMSOL, calculation was performed with a two-dimensional cylindrical symmetric structure in consideration of calculation efficiency. Therefore, the shape of the frame 14 or the film 18 was circular.

First, in order to see the influence of division (formation of double peaks) due to interaction between the maximum values of the transmission loss, a case was calculated in which the diameter of the frame 14 was 25 mm, the film thickness of the film 18 was 200 μm, and the through-hole 22 having a diameter of 2 mm was formed in both the laminated films 18. The inter-film distance between the two layers was calculated every 1 mm between 5 mm and 40 mm, and the frequency range in the vicinity of the transmission loss peak was calculated every 0.5 Hz. FIG. 20 shows the spectrum of the transmission loss in a case where the inter-film distance is changed every 5 mm. It can be seen that the transmission loss peak is present at two frequencies according to the inter-film distance and the peak height is larger than the transmission loss in a case where the inter-film distance is 40 mm.

The difference in the frequency of the double peak at this time was calculated and plotted in FIG. 21 as a function of the inter-film distance. Assuming that the inter-film distance is a (mm), the difference in the frequency of the double peak was approximately correlated to $\exp(-0.13 \times a)$.

In order to examine the characteristics of lower frequencies, a case was calculated in which the diameter of the frame 14 was 25 mm, the film thickness of the film 18 was 100 μm, and the through-hole 22 having a diameter of 2 mm was formed in both the laminated films 18. As the film thickness became smaller, the soundproof cell 26 became effectively softer, and the transmission loss peak also shifted to the low frequency side. The inter-film distance was calculated every 1 mm between 5 mm and 35 mm, and the frequency range in the vicinity of the transmission loss peak was calculated every 0.5 Hz or the like. In this case, the transmission loss spectrum in a case where the inter-film distance is changed every 5 mm is shown in FIG. 22. The difference in the frequency of the double peak was calculated and plotted in FIG. 23 as a function of the inter-film distance. The difference in the frequency of the double peak was correlated to approximately $\exp(-0.14 \times a)$ for the inter-film distance. Thus, the dependency of the division width of the double peak on the distance hardly changes even in the case of double peaks of the transmission loss at the significantly different frequencies.

Figure 24A:
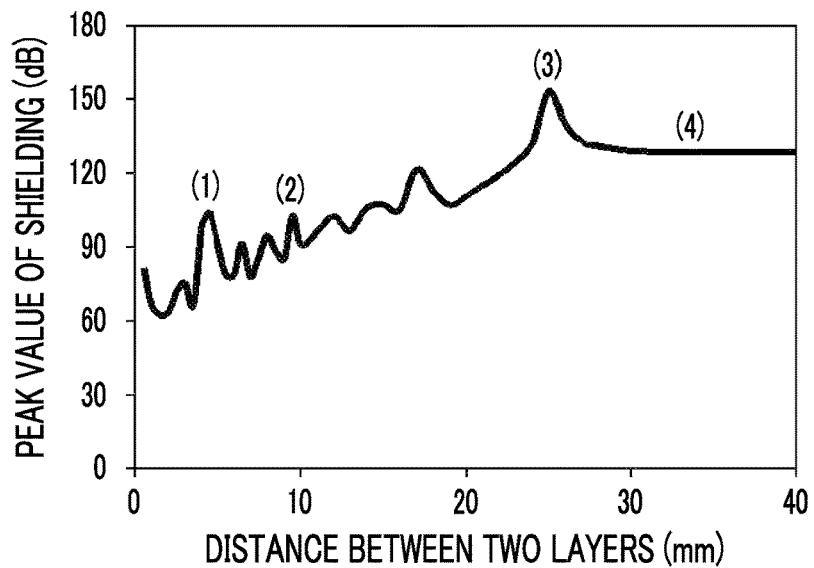
FIG. 24A is a graph showing the peak value of the transmission loss with respect to the inter-film distance between the two layers of the soundproof structure of the present invention.

FIG. 24A is a graph showing the peak value of the transmission loss with respect to the inter-film distance between the two layers of the soundproof structure of the present invention.

Figure 24B:
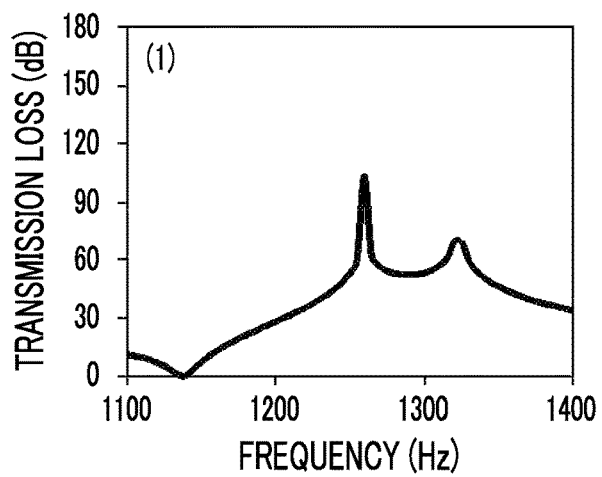
FIG. 24B is a graph showing the sound insulation characteristics at the inter-film distance between two layers indicating one peak value shown in FIG. 24A.
Figure 24C:
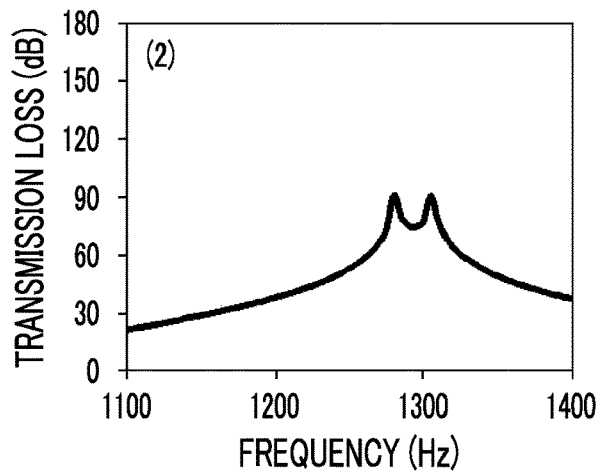
FIG. 24C is a graph showing the sound insulation characteristics at the inter-film distance between two layers indicating another one peak value shown in FIG. 24A.

In the graph shown in FIG. 24A, in a region represented by (1) and (2) in which the inter-film distance between the two layers is small and the peak value of shielding indicates a peak, the peak value is divided in the graph of the transmission loss with respect to the frequency to form double peaks and the frequency width is inversely proportional to the inter-film distance between the two layers, in a case where the inter-film distance between the two layers is small, as shown in FIGS. 24B and 24C.

Figure 24D:
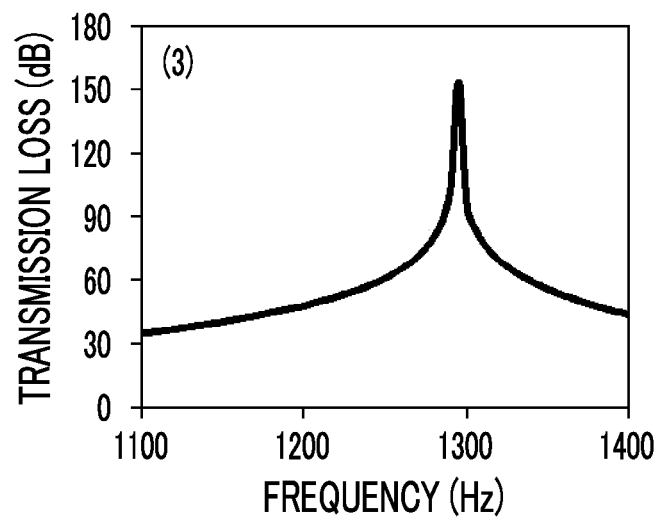
FIG. 24D is a graph showing the sound insulation characteristics at the inter-film distance between two layers indicating another one peak value shown in FIG. 24A.

In the graph shown in FIG. 24A, in a peak region represented by (3) in which the peak value of shielding is the highest, the maximum value of the transmission loss is a maximum value in the graph of the transmission loss with respect to the frequency, as shown in FIG. 24D.

Figure 24E:
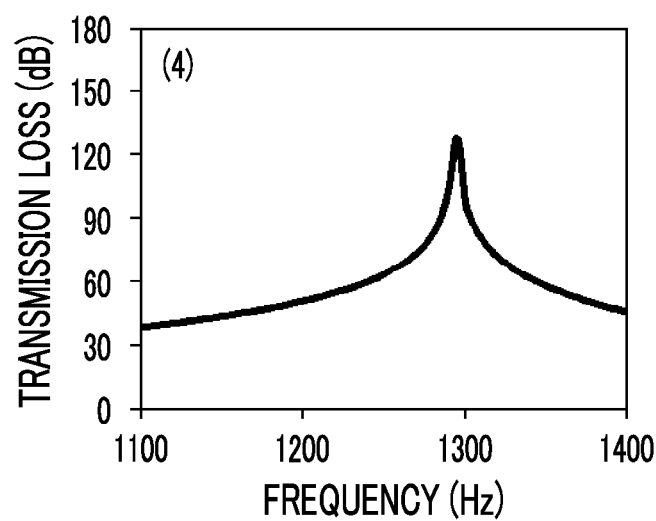
FIG. 24E is a graph showing the sound insulation characteristics at the inter-film distance between two layers indicating another one peak value shown in FIG. 24A.

In the graph shown in FIG. 24A, in a region represented by (4) in which the inter-film distance between the two layers is small and there is no change in the peak value of shielding or the change in the peak value of shielding is small, the peak value is stable at the maximum value of the transmission loss smaller than the above maximum value in the graph of the transmission loss with respect to the frequency, as shown in FIG. 24E.

From the above, it can be seen that the soundproof structure of the present invention has excellent sound insulation characteristics capable of shielding a specific target frequency component very strongly and can increase the absorption of components on the lower frequency side.

In addition, in the soundproof structure of the present invention, according to the inter-film distance between the single layer soundproof structures forming a laminated soundproof structure, it is possible to increase the intensity of sound insulation to strengthen the sound insulation or to widen the sound insulation frequency. Therefore, it is possible to easily adjust the sound insulation characteristics according to the inter-film distance. As described above, the effect of the present invention is obvious.

In the soundproof structure of the present invention, it is preferable that the first natural vibration frequency is determined by a geometric form of the frame of each of the one or more soundproof cells and stiffness of the film of each of the one or more soundproof cells and that the shielding peak frequency is determined according to an area of the opening portion of each of the one or more soundproof cells.

It is preferable that the first natural vibration frequency is determined by a shape and a size of the frame of each of the one or more soundproof cells and thickness and flexibility of the film of each of the one or more soundproof cells and that the shielding peak frequency is determined according to an average area ratio of the opening portions of the one or more soundproof cells.

It is preferable that the opening portion of each of the one or more soundproof cells is formed by one hole.

It is preferable that the opening portion of each of the one or more soundproof cells is formed by a plurality of holes having the same size.

It is preferable that a size of each of the one or more holes of the opening portion of each of the one or more soundproof cells is 2 µm or more.

It is preferable that the average size of the frames of the one or more soundproof cells is equal to or less than a wavelength size corresponding to the shielding peak frequency.

It is preferable that the one or more holes of the opening portion of each of the one or more soundproof cells are holes drilled using a processing method for absorbing energy, and it is preferable that the processing method for absorbing energy is laser processing.

It is preferable that the one or more holes of the opening portion of each of the one or more soundproof cells are holes drilled using a mechanical processing method based on physical contact, and it is preferable that the mechanical processing method is punching or needle processing.

It is preferable that the film is impermeable to air.

It is preferable that one hole of the opening portion of the soundproof cell is provided at a center of the film.

It is preferable that the film is formed of a flexible elastic material.

In a case where one or more soundproof cells are a plurality of soundproof cells arranged in a two-dimensional manner, it is preferable that frames of the plurality of soundproof cells are formed by one frame body that covers the plurality of soundproof cells.

In a case where one or more soundproof cells are a plurality of soundproof cells arranged in a two-dimensional manner, it is preferable that films of the plurality of soundproof cells are formed by one sheet-shaped film body that covers the plurality of soundproof cells.

In the case of manufacturing the soundproof structure of the present invention, it is preferable that one or more holes of opening portions of each of one or more soundproof cells are drilled in the film of each soundproof cell using a processing method for absorbing energy or a mechanical processing method based on physical contact.

It is preferable that the processing method for absorbing energy is laser processing and the mechanical processing method is punching or needle processing.

While the soundproof structure of the present invention has been described in detail with reference to various embodiments and examples, the present invention is not limited to these embodiments and examples, and various improvements or modifications may be made without departing from the scope and spirit of the present invention.

EXPLANATION OF REFERENCES 10, 10A, 10B, 10C, 10D, 10E, 10F: soundproof structure
12: through-hole
14, 56, 60, 66: frames
15, 68a, 68b: plate-shaped member
16, 68: frame body
18: film
20: film body
22: hole
24: opening portion
26, 41a, 41b, 41c, 41d, 41e, 54, 58, 64: soundproof cell
30, 30a, 30B: single layer soundproof structure
32, 33: spacer
40a, 40b, 40c, 40d, 62: soundproof member
42: cover
44: hole
46, 50: detaching mechanism
48: wall
52a: protruding portion
52b: recessed portion

What is claimed is:

1. A laminated soundproof structure formed by laminating a single layer soundproof structure having one or more soundproof cells arranged in a two-dimensional plane,
    wherein each of the one or more soundproof cells of the single layer soundproof structure comprises a frame having a through-hole, a film fixed to the frame, and an opening portion configured to include one or more holes drilled in the film,
    the single layer soundproof structure has a basic shielding peak frequency, which is determined by the opening portion of each of the one or more soundproof cells and a mass of the film without an additional weight and at which a transmission loss is maximized, on a lower frequency side than a first natural vibration frequency of the film of each of the one or more soundproof cells,
    one soundproof cell of one of the laminated single layer soundproof structures and one soundproof cell of the other laminated single layer soundproof structure are laminated with a distance therebetween, and
    at least some of the soundproof cells laminated with the distance therebetween have the same conditions of the frame, the film, and the opening portion.

2. The soundproof structure according to claim 1, wherein the one or more soundproof cells are a plurality of soundproof cells arranged in a two-dimensional manner.

3. The soundproof structure according to claim 1, wherein the laminated soundproof structure has one or more minimum values at which a transmission loss due to natural vibration of the laminated soundproof cells is minimized, has one or more maximum values, which are determined by the opening portions of the laminated soundproof cells and at which a transmission loss is maximized, on a lower frequency side than one or more minimum frequencies corresponding to the one or more minimum values, and has one or more lamination shielding peak frequencies corresponding to the one or more maximum values, and
    sound in a frequency band centered on each of the one or more lamination shielding peak frequencies is selectively insulated.

4. The soundproof structure according to claim 3, wherein the laminated soundproof structure has, as the one or more minimum frequencies, two or more maximum values of absorption at which a sound absorbance is maximized by interaction of the first natural vibration frequencies of the two laminated single layer soundproof structures, natural vibrations thereof, and a gas layer between two layers, and has two or more maximum frequencies of absorption corresponding to the two or more maximum values of absorption.

5. The soundproof structure according to claim 4, wherein, in the laminated soundproof structure, as the distance between the two laminated single layer soundproof structures becomes larger, the two or more maximum frequencies of absorption corresponding to the two or more maximum values of absorption become closer to each other.

6. The soundproof structure according to claim 3, wherein the laminated soundproof structure has two or more maximum values of transmission loss which are determined on a lower frequency side than the first natural vibration frequency of each of the two laminated single layer soundproof structures due to the opening portion of each of the laminated soundproof cells and at which the transmission loss is maximized, as the one or more lamination shielding peak frequencies, due to interaction between the natural vibrations of the soundproof cells laminated in two layers, and has two or more lamination shielding peak frequencies corresponding to the two or more maximum values of transmission loss.

7. The soundproof structure according to claim 6,
wherein, in the laminated soundproof structure, as the distance between the two laminated single layer soundproof structures becomes larger, the two or more lamination shielding peak frequencies corresponding to the two or more maximum values of transmission loss become closer to each other.

8. The soundproof structure according to claim 7,
wherein, assuming that the distance is a, a difference between the two or more lamination shielding peak frequencies is expressed by following Equation (1), $$Df = C \times \exp(-b \times a) \quad (1),$$

where a unit of the distance a is mm and b and c are constants.

9. The soundproof structure according to claim 8,
wherein the constant b is a value within a range of 0.1 to 0.2.

10. The soundproof structure according to claim 3,
wherein the distance between the two laminated single layer soundproof structures of the laminated soundproof structure is less than a wavelength of a shielding peak at which the transmission loss is maximized.

11. The soundproof structure according to claim 3,
wherein the one or more maximum values of the transmission loss of the laminated soundproof structure are larger values than a maximum value of the transmission loss of the single layer soundproof structure due to the single layer soundproof structure being laminated in two layers.

12. The soundproof structure according to claim 3,
wherein the laminated soundproof structure has a maximum value of an absorbance on a lower frequency side than a maximum value of the transmission loss on a lower frequency side than the first natural vibration frequency of each of the two laminated single layer soundproof structures, which is determined by the opening portion of each of the laminated soundproof cells, due to the single layer soundproof structure being laminated in two layers.

13. The soundproof structure according to claim 1,
wherein a frequency on a lower frequency side than a minimum value of the transmission loss corresponding to the first natural vibration frequency of the single layer soundproof structure is included in a range of 10 Hz to 100000 Hz.

14. The soundproof structure according to claim 1,
wherein, assuming that a circle equivalent radius of the frame is R2 (m), a thickness of the film is t2 (m), a Young's modulus of the film is E2 (Pa), and a density of the film is d (kg/m³), a parameter B expressed by following Equation (2) is 15.47 or more and 235000 or less, $$B = t2/R2^2 * \sqrt{(E2/d)} \quad (2).$$

15. The soundproof structure according to claim 1,
wherein, in a case where the one or more soundproof cells of the laminated soundproof structure are a plurality of soundproof cells arranged in a two-dimensional manner, 60% or more of the laminated soundproof cells are formed by the frame, the film, and the opening portion of the same size.

16. The soundproof structure according to claim 1,
wherein the frame of each of the laminated soundproof cells of the laminated soundproof structure has a continuous frame structure, and
in at least some of the laminated soundproof cells, the film is disposed on two or more planes of at least one plane of two surfaces of the frame structure and/or a plane of an intermediate portion between the two surfaces.

17. The soundproof structure according to claim 1,
wherein, in at least some of the laminated soundproof cells of the laminated soundproof structure, a space between the films of the soundproof cells laminated so as to be adjacent to each other is blocked by the frame.

18. The soundproof structure according to claim 1,
wherein, in at least some of the laminated soundproof cells of the laminated soundproof structure, the opening portions drilled in the films overlap each other.

19. The soundproof structure according to claim 1,
wherein "conditions of the frame, the film, and the opening portion of the laminated soundproof cells are the same" means that an average of a shift amount of each of a first natural vibration frequency and a shielding peak frequency of a spectrum of the transmission loss between the soundproof cells of the laminated single layer soundproof structures of the laminated soundproof structure is 10% or less.

\* \* \* \* \*